US010931668B2

(12) United States Patent
Mehta

(10) Patent No.: US 10,931,668 B2
(45) Date of Patent: Feb. 23, 2021

(54) METHODS, SYSTEMS, AND COMPUTER READABLE MEDIA FOR NETWORK NODE VALIDATION

(71) Applicant: Oracle International Corporation, Redwood Shores, CA (US)

(72) Inventor: Vikram Mehta, Greensboro, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 292 days.

(21) Appl. No.: 16/024,422

(22) Filed: Jun. 29, 2018

(65) Prior Publication Data
US 2020/0007538 A1 Jan. 2, 2020

(51) Int. Cl.
*H04W 12/06* (2009.01)
*H04W 12/08* (2009.01)
(Continued)

(52) U.S. Cl.
CPC .......... *H04L 63/0876* (2013.01); *H04L 63/10* (2013.01); *H04W 12/06* (2013.01);
(Continued)

(58) Field of Classification Search
CPC . H04L 63/0876; H04L 63/0853; H04L 63/10; H04W 12/1202; H04W 12/06;
(Continued)

(56) References Cited

U.S. PATENT DOCUMENTS 6,091,958 A 7/2000 Bergkvist et al.
6,151,503 A * 11/2000 Chavez .................. H04W 4/16
455/417

(Continued)

FOREIGN PATENT DOCUMENTS

CN 101917698 A * 12/2010
CN 103179504 A 6/2013
(Continued)

OTHER PUBLICATIONS

Final Office Action for U.S. Appl. No. 16/100,172 (dated Oct. 3, 2019).
(Continued)

*Primary Examiner* — Techane Gergiso
(74) *Attorney, Agent, or Firm* — Jenkins, Wilson, Taylor & Hunt, P.A.

(57) ABSTRACT

Methods, systems, and computer readable media for network node validation are disclosed. One method occurs at a first network node. The method includes receiving, from a second network node, a first message associated with a mobile subscriber; sending, by the first network node, a query to the second network node, the query requesting identification information identifying mobile communications equipment of the mobile subscriber; receiving, by the first network node, a response to the query from the second network node, wherein the response includes the identification information; extracting, from the response, the identification information; comparing the identification information extracted from the response and validated identification information identifying the mobile communications equipment of the mobile subscriber; and in response to the identification information matching the validated identification information, recognizing the second network node as being authorized to send the first message and processing the first message.

18 Claims, 8 Drawing Sheets

(51) Int. Cl.
*H04W 8/02* (2009.01)
*H04W 8/18* (2009.01)
*H04L 29/06* (2006.01)

(52) U.S. Cl.
CPC .............. *H04W 12/08* (2013.01); *H04W 8/02* (2013.01); *H04W 8/18* (2013.01)

(58) Field of Classification Search
CPC . H04W 12/00514; H04W 12/08; H04W 8/02; H04W 8/18
See application file for complete search history.

(56) References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 * | 1/2002 | Calabrese .............. H04W 8/04 455/432.1 |
| 6,591,101 B1 * | 7/2003 | Shimbori ................ H04W 8/06 455/432.1 |
| 7,043,754 B2 | 5/2006 | Arnouse |
| 7,567,661 B1 * | 7/2009 | Wood .................. H04M 3/2218 379/134 |
| 8,045,956 B2 | 10/2011 | Sun et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 10,021,738 B1 | 7/2018 | Mehta et al. |
| 10,212,538 B2 | 2/2019 | Russell |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,616,200 B2 | 4/2020 | Kumar et al. |
| 2001/0046856 A1 | 11/2001 | McCann |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0174082 A1 | 7/2007 | Singh |
| 2007/0281718 A1 | 12/2007 | Nooren |
| 2008/0004047 A1 | 1/2008 | Hill et al. |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0125116 A1 | 5/2008 | Jiang |
| 2008/0207181 A1 | 8/2008 | Jiang |
| 2008/0222038 A1 | 9/2008 | Eden |
| 2009/0045251 A1 | 2/2009 | Jaiswal et al. |
| 2009/0195349 A1 | 8/2009 | Frader-Thompson et al. |
| 2010/0062789 A1 | 3/2010 | Agarwal et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0307381 A1 | 12/2011 | Kim et al. |
| 2012/0099715 A1 | 4/2012 | Ravishankar et al. |
| 2012/0131121 A1 | 5/2012 | Snyder et al. |
| 2012/0203663 A1 | 8/2012 | Sinclair et al. |
| 2012/0207015 A1 | 8/2012 | Marsico |
| 2013/0171988 A1 | 7/2013 | Yeung et al. |
| 2013/0331063 A1 | 12/2013 | Cormier et al. |
| 2014/0199961 A1 | 7/2014 | Mohammed et al. |
| 2014/0280645 A1 | 9/2014 | Shuman et al. |
| 2014/0378129 A1 | 12/2014 | Jiang et al. |
| 2015/0012415 A1 | 1/2015 | Livne et al. |
| 2015/0094060 A1 * | 4/2015 | Kouridakis ........... H04W 60/06 455/435.1 |
| 2015/0188979 A1 | 7/2015 | Almeras et al. |
| 2016/0088461 A1 | 3/2016 | Jiang |
| 2016/0156647 A1 | 6/2016 | Engel et al. |
| 2016/0165432 A1 | 6/2016 | Dubesset et al. |
| 2016/0269566 A1 | 9/2016 | Gundamaraju et al. |
| 2016/0292687 A1 | 10/2016 | Kruglick |
| 2017/0345006 A1 | 11/2017 | Kohli |
| 2018/0020324 A1 | 1/2018 | Beauford |
| 2018/0109953 A1 | 4/2018 | He |
| 2018/0167906 A1 | 6/2018 | Chellamani et al. |
| 2018/0205698 A1 | 7/2018 | Gupta et al. |
| 2018/0310162 A1 | 10/2018 | Kim et al. |
| 2019/0007788 A1 | 1/2019 | Russell |
| 2019/0044932 A1 | 2/2019 | Kumar et al. |
| 2020/0053044 A1 | 2/2020 | Mahalank et al. |

FOREIGN PATENT DOCUMENTS

| | | |
|---|---|---|
| CN | 107 800 664 A | 3/2018 |
| EP | 1 067 492 A2 | 1/2001 |
| EP | 1 906 682 A1 | 4/2008 |
| EP | 2 204 955 A1 | 7/2010 |
| EP | 3 493 569 A1 | 6/2019 |
| WO | WO 2005/091656 A1 | 9/2005 |
| WO | WO 2005/101872 A1 | 7/2007 |
| WO | WO 2007/084503 A2 | 4/2008 |
| WO | WO 2010/045646 A2 | 4/2010 |
| WO | WO 2010/105099 A2 | 9/2010 |
| WO | WO 2011/047382 A2 | 4/2011 |
| WO | WO 2019/005287 A1 | 1/2019 |
| WO | WO 2019/027813 A1 | 2/2019 |
| WO | WO 2020/013889 A1 | 1/2020 |
| WO | WO 2020/033113 A1 | 2/2020 |

OTHER PUBLICATIONS

Applicant-Initiated Interview Summary for U.S. Appl. No. 15/666,300 (dated Oct. 29, 2019).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Final Office Action for U.S. Appl. No. 15/408,155 (dated Jul. 26, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpubllshed, filed Jul. 13, 2018).

(56) References Cited

OTHER PUBLICATIONS

Notice of Allowance and Fee(s) Due for U.S. Appl. No. 15/636,118 (dated Apr. 27, 2018).
Non-Final Office Action for U.S. Appl. No. 15/376,631 (dated Apr. 18, 2018).
Examiner's Answer for U.S. Appl. No. 13/047,287 (dated Feb. 26, 2018).
Advisory Action Before the Filing of an Appeal Brief and AFCP 2.0 Decision for U.S. Appl. No. 15/676,631 (dated Feb. 2, 2018).
Non-Final Office Action for U.S. Appl. No. 15/408,155 (dated Jan. 9, 2018).
Final Office Action for U.S. Appl. No. 15/376,631 (dated Nov. 28, 2017).
Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," Etsi Ts 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks," http://www.diva-portal.org/smash/get/diva2:951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).

Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9),"ETSI TS 129 172, V9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V 11.0.0 Release 11." ETSI TS 122 071 V11.0.0. pp. 1-50 (Oct. 2012).
Restriction and/or Election Requirement for U.S. Appl. No. 12/823,559 (dated Aug. 27, 2012).
Non-Final Office Action for U.S. Appl. No. 13/047,287 (dated Jun. 6, 2012).
"3rd Generation Partnership Project; Technical Specification Group Services and System Aspects; Telecommunication management; Charging management; Diameter charging applications (Release 11)," 3GPP TS 32.299, V11 .3.0, pp. 1-150 (Mar. 2012).
"NET-NET Diameter Director," http://www.oracle.com/us/industries/communications/net-net- diameter-director-ds-1985034.pdf, pp. 1-9 (Copyright 2012).
"3rd Generation Partnership Project; Technical Specification Group Core Network and Terminals; Policy and Charging Control (PCC) over Gx/Sd reference point (Release 11)," 3GPP TS 29.212, V11. 3.0, pp. 1-171 (Dec. 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
"Draft LS on network verification of UE provided location," 3GPP TSG SA WG2 Meeting #81, pp. 1 (Oct. 11-15, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"Digital cellular telecommunications system (Phase 2+); Universal Mobile Telecommunications System (UMTS); Circuit Switched

(56) References Cited

OTHER PUBLICATIONS (CS) fallback in Evolved Packet System (EPS); Stage 2 (3GPP TS 23.272 V 8.0.0 Release 8)," ETSI TS 123 272 V8.0.0, pp. 1-42 (Nov. 2008).
Hakala et al., "Diameter Credit-Control Application," RFC 4006, pp. 1-115 (Aug. 2005).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Applicant-Initiated Interview Summary for U.S. Appl. No. 16/100,172 (dated Jul. 18, 2019).
Notice of Allowance and Fee(s) Due and Examiner-Initiated Interview Summary for U.S. Appl. No. 15/376,631 (dated Jul. 2, 2019)
Non-Final Office Action for U.S. Appl. No. 15/666,300 (dated Jun. 27, 2019).
Decision on Appeal for U.S. Appl. No. 13/047,287 (dated Jun. 18, 2019).
Notification of Transmittal of the International Search Report and the Written Opinion of the International Searching Authority, or the Declaration for International Patent Application No. PCT/US2019/018990 (dated May 8, 2019).
Non-Final Office Action for U.S. Appl. No. 16/100,172 (dated Apr. 11, 2019).
Notice of Allowance and Fee(s) Due for U.S. Appl. No. 16/035,008 (dated Jan. 18, 2019)
Advisory Action Before the Filing of an Appeal Brief and AFCP 2.0 Decision for U.S. Appl. No. 15/376,631 (dated Dec. 19, 2018).
Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).
Advisory Action and Applicant-Initiated Interview Summary for U.S. Appl. No. 16/100,172 (dated Dec. 20, 2019).
Notification of Transmittal of the International Search Report and the Written Opinion of the International Searching Authority, or the Declaration for International Application Serial No. PCT/US2019/042203 (dated Nov. 11, 2019).
"Technical Specification Group Core Network and Terminals; Evolved Packet System (EPS); Mobility Management Entity (MME) and Serving GPRS Support Node (SGSN) related interfaces based on Diameter protocol (Release 16)." 3GPP TS 29.272. V16.0.0. pp. 1-180 (Sep. 2019).
"Technical Specification Group Core Network and Terminals; Policy and Charging Control (PCC); Reference points (Release 16)," 3GPP TS 29.212, V16.1.0, pp. 1-285 (Sep. 2019).
"Technical Specification Group Core Network and Terminals; Mobile Application Part (MAP) specification (Release 15)" 3GPP TS 29.002, V15.5.0, pp. 1-1024 (Jun. 2019).
Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).
Communication of European publication number and information on the application of Article 67(3) EPC for European Application Serial No. 18731923.1 (dated Apr. 8, 2020).
Non-Final Office Action for U.S. Appl. No. 16/100,172 (dated Mar. 6, 2020).
Notice of Allowance and Fee(s) Due and Examiner-Initiated Interview Summary for U.S. Appl. No. 15/666,300 (dated Feb. 13, 2020).
"Signalling Security in Telecom SS7/Diameter/5G," Enisa, pp. 1-30 (Mar. 2018).
"GSMA Guidelines for Diameter Firewall," NetNumber Inc., pp. 1-7 (Sep. 12, 2017).

Notification of Transmittal of the International Search Report and the Written Opinion of the International Searching Authority, or the Declaration for International Application Serial No. PCT/US2019/028814 (dated Aug. 20, 2019).
Notice of Allowance and Fee(s) Due for U.S. Appl. No. 12/581,739 (dated Aug. 8, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
Final Office Action for U.S. Appl. No. 12/581,739 (dated Dec. 30, 2011).
Non-Final Office Action for U.S. Appl. No. 12/581,739 (dated Aug. 26, 2011).
Notification of Transmittal of the Internatioanl Search Report and the Written Opinion of the International Searching Authority, or the Declaration for International Application No. PCT/US2010/027043 (dated Oct. 19, 2010).
Notification of Transmittal of the International Search Report and the Written Opinion of the International Searching Authority, or the Declaration for International Application No. PCT/US2009/061187 (dated May 17, 2010).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).
Applicant-Initiated Interview Summary for U.S. Appl. No. 16/100,172 (dated Jun. 9, 2020).
"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

(56) References Cited

OTHER PUBLICATIONS

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Sahu et al., "How 5G Registration Works," http://5gblogs.com/5g-registration/, 10 pages (Oct. 12, 2018).

"Oracle Communications Diameter Signaling Router Main Differentiators," Oracle White Paper, pp. 1-10 (Jul. 2017).

"LTE and EPC Roaming Guidelines," GSM Association, Official Document IR.88, V 16.0, pp. 1-90 (Jul. 5, 2017).

"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).

* cited by examiner

METHODS, SYSTEMS, AND COMPUTER READABLE MEDIA FOR NETWORK NODE VALIDATION

TECHNICAL FIELD

The subject matter described herein relates to methods and systems for network security. More particularly, the subject matter described herein relates to methods, systems, and computer readable media for network node validation.

BACKGROUND

Communications networks can be targeted by malicious actors for a variety of reasons, e.g., financial gain, espionage, or political aims. For example, vulnerabilities associated with signaling system number 7 (SS7) networks and Diameter networks allow some entities to commit revenue fraud, perform unauthorized call interceptions or call taps, and/or steal personal subscriber information. When such issues occur, many times an innocent party may be held responsibility for rectifying and/or mitigating the damage. While network operators generally use security appliances, firewalls, and/or other devices to help prevent unauthorized access to their networks and customers, numerous issues can still exist within their networks due to the inherent security issues associated with protocols and/or procedures used in these networks.

SUMMARY

Methods, systems, and computer readable media for network node validation are disclosed. One method occurs at a first network node. The method includes receiving, from a second network node, a first message associated with a mobile subscriber; sending, by the first network node, a query to the second network node, the query requesting identification information identifying mobile communications equipment of the mobile subscriber; receiving, by the first network node, a response to the query from the second network node, wherein the response includes the identification information; extracting, from the response, the identification information; comparing the identification information extracted from the response and validated identification information identifying the mobile communications equipment of the mobile subscriber, wherein the validated identification information is from a trusted source separate from the second network node; in response to the identification information extracted from the response matching the validated identification information, recognizing the second network node as being authorized to send the first message and processing the first message; and in response to the identification information extracted from the response not matching the validated identification information, recognizing the second network node as not being authorized to send the first message and identifying the first message as a network security threat.

One system includes a first network node. The first network node includes at least one processor and memory. The first network node is configured for: receiving, from a second network node, a first message associated with a mobile subscriber; sending, by the first network node, a query to the second network node, the query requesting identification information identifying mobile communications equipment of the mobile subscriber; receiving, by the first network node, a response to the query from the second network node, wherein the response includes the identification information; extracting, from the response, the identification information; comparing the identification information extracted from the response and validated identification information identifying the mobile communications equipment of the mobile subscriber, wherein the validated identification information is from a trusted source separate from the second network node; in response to the identification information extracted from the response matching the validated identification information, recognizing the second network node as being authorized to send the first message and processing the first message; and in response to the identification information extracted from the response not matching the validated identification information, recognizing the second network node as not being authorized to send the first message and identifying the first message as a network security threat.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
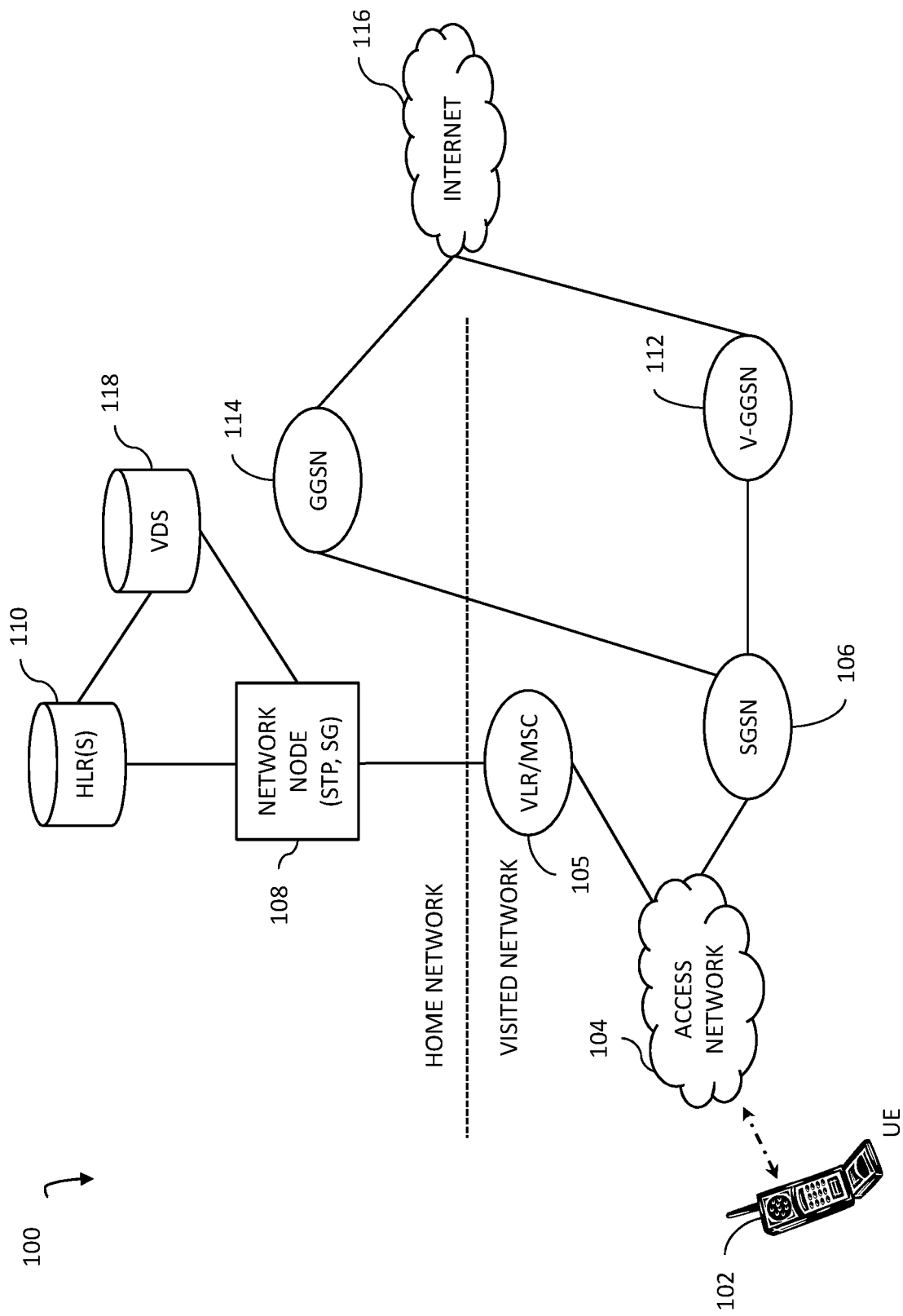
FIG. 1 is a diagram illustrating an example communications environment for network node validation.

The subject matter described herein relates to methods, systems, and computer readable media for network node validation. Vulnerabilities exist in various communications networks, including mobile communications networks. For example, a malicious network node may be programmed or otherwise configured to generate and send a fraudulent mobility management message (e.g., update location messages) to a home network of one or more subscribers. In this example, a fraudulent message may include a mobile subscriber and/or user device identifier (e.g., an international mobile subscriber identity (IMSI) or a mobile station international subscriber directory number (MSISDN)) and may provide location information indicating that the mobile subscriber is roaming in its network. Since such networks may not validate mobility management messages or location information therein, a home network or a node therein may act on fraudulent mobility management messages by providing the malicious network node with subscriber data (e.g., a mobile subscriber profile) which can be utilized to commit revenue fraud, perform call interception, steal subscriber profile details, and/or other malicious activities.

In accordance with some aspects of the subject matter described herein, techniques, methods, systems, or mechanisms are disclosed for network node validation. For example, a home network node may use a network node validation algorithm for determining whether a foreign network node, e.g., a node appearing to be a mobility management element (MME), a visitor location register (VLR), a mobile switching center (MSC), is valid. In some embodiments, a network node validation algorithm may involve obtaining subscriber related information or identification information (e.g., an international mobile equipment identity (IMEI), an equipment identifier, an encryption key, or a mobile subscriber related security value) from a network node to be validated and determining whether the identification information from the network node to be validated matches trusted or verified subscriber related information stored in a validation data store. In some embodiments, if subscriber related information from a network node does not match subscriber related information from a validation data store, then the network node is determined to be invalid or likely to be invalid and one or more mitigation actions may be performed, such as sending a purge MS message to a home location register (HLR), discarding the message, notifying a network operator of potential malicious activities, or other mitigating actions. In some embodiments, if subscriber related information from a network node to be validated does match subscriber related information from a validation data store, then the network node is determined to be valid or likely to be valid and one or more actions may be performed, such as processing the message and/or sending the message onward toward an HLR.

Advantageously, by obtaining subscriber related information (e.g., unique and/or semi-private identification information such as an IMEI) from a network node purporting to be in contact with a mobile subscriber, a home network node (e.g., a signal transfer point) may validate network nodes (e.g., from a foreign network) and perform one or more mitigating actions when such network nodes appear to be invalid (e.g., fraudulent), thereby preventing or mitigating malicious activities and their negative consequences (e.g., revenue fraud).

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example communications environment 100 for network node validation. FIG. 1 includes a UE 102 (e.g., a mobile device, a computer, a tablet computing platform, or a smartphone) capable of roaming or moving between different portions of a communications environment 100. In some embodiments, communications environment 100 may include one or more nodes associated with a third generation (3G) network and/or a second generation (2G) network.

Communications environment 100 may include a home network, e.g., a home public land mobile network (HPLMN), and a visited network, e.g., a visited public land mobile network (VPLMN). The home network may be associated with UE 102 and may be the UE's default network, while the visited network may be a network that UE 102 may use, may attempt to use, or may appear to use while roaming outside the home network's coverage area. In some embodiments, the home network and the visited network may include nodes for communicating with an external network, such as Internet 116.

The home network may include various nodes, e.g., a gateway general packet radio service (GPRS) support node (GGSN) 114, a network node (NN) 108, one or more HLR(s) 110 and/or a validation data store (VDS) 118. In some embodiments, a home network may be configured as a mobile subscriber's default roaming provider. In some embodiments, a home network may be configured to allow a mobile subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access). For example, an ARP may provide data services at lower rates than a mobile subscriber's home network and may also help in alleviating network load or congestion in the mobile subscriber's home network by handling some subscribers' IP traffic.

GGSN 114 may be any suitable entity for providing access to Internet 116 or other data networks, e.g., an Internet access point. In some embodiments, if serving GPRS support node (SGSN) 106 receives a signaling message indicating that a roaming subscriber cannot receive data services via an ARP, SGSN 106 may route IP traffic and/or related messages destined for Internet 116 via GGSN 114 in the home network.

HLR(s) 110 may represent any suitable entity or entities for maintaining and/or providing one or more subscriber data management (SDM) or customer relationship management (CRM) functions. HLR(s) 110 may maintain subscriber-related information, such as user identification, control information for user authentication and authorization, location information, and user profile data. For example, HLR(s) 110 may include a database containing details about a mobile subscriber identity module (SIM) card associated with UE 102, services available to UE 102, and the current location (e.g., current serving node) of UE 102.

In some embodiments, where HLR(s) 110 involves multiple nodes, each node may maintain information for a portion of subscribers, e.g., hundreds of thousands to millions of subscribers and various nodes in communications environment 100 may be configured to identify and consult the appropriate node for information about a particular subscriber.

In some embodiments, HLR(s) 110 may perform mobility management procedures in response to receiving a MAP message or other messages. Mobility management messages may be received from SGSN 106 or other nodes in communications environment 100.

NN 108 may be any suitable entity (e.g., one or more computing platforms or devices) for receiving, processing, routing, and/or forwarding messages. In some embodiments, NN 108 may include a gateway, a signaling router, a signaling platform, a signal transfer point (STP), a signaling system number 7 (SS7) node, or a signaling node.

In some embodiments, NN 108 may include functionality for facilitating communications between nodes in the home network and nodes in the visited network. For example, mobility management messages and/or registration related messages may be sent from SGSN 106 to HLR(s) 110 via NN 108. While only one SP is depicted in communications environment 100, it will be appreciated that multiple SPs may be used to facilitate communication between nodes in communications environment 100.

In some embodiments, NN 108 may include functionality for filtering and/or validating messages and/or for performing global title translation (GTT). For example, NN 108 may analyze header information in signaling messages and may determine how to process or route the signaling messages. In this example, some filtering may include determining whether a signaling message is addressed to an appropriate node or includes appropriate parameters or other information. GTT may include identifying an appropriate destination for a signaling message (e.g., based on global title information) and routing the signaling message to the identified destination.

In some embodiments, NN 108 may include functionality for identifying messages that contain subscriber location information, such as mobility management messages from roaming subscribers. For example, NN 108 may be configured to use GTT functionality, such as filters associated with signaling connection control part (SCCP) subsystem numbers (SSNs) or MAP operation codes (opcodes) to identify relevant messages (e.g., a MAP ULR message) from a foreign network (e.g., a visited network). In this example, NN 108 may identify relevant messages by filtering signaling messages associated with a VLR (e.g., a calling party (CgPN) SSN='6'), and/or HLR(s) 110 (e.g., a called party (CdPN) SSN='149') and/or by filtering certain types of signaling messages using opcodes (e.g., MAP ISD messages may be associated with an opcode value of '7').

In some embodiments, location information may include any information usable for identifying a location of a UE or an associated subscriber. For example, location information may include a mobile country code (MCC) a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), location coordinates (e.g., global positioning system (GPS) information), and relative location information.

In some embodiments, NN 108 may include functionality for determining a trust level (e.g., a trustworthiness metric) associated with a network node and may perform various actions based on this determination. For example, NN 108 may utilize one or more data structures (e.g., a whitelist and a blacklist) to identify whether a network node is trusted, untrusted, or unknown and may perform other actions based on this trust level determination. In this example, if a network node is unknown, NN 108 may perform network node validation; if a network node is untrusted, all messages from the network node may be blocked or discarded; and if a network node is trusted, subscriber related information may be requested from the network node and may be stored (e.g., in a validation data store or other memory) such that the trusted subscriber related information can be used to validate other network nodes.

In some embodiments, NN 108 may include functionality for performing network node validation. For example, NN 108 may utilize a network node validation algorithm for determining whether a visited or foreign network node, e.g., a node appearing to be a VLR or MSC, is valid. In some embodiments, a network node validation algorithm may involve obtaining subscriber related information (e.g., an international mobile equipment identity (IMEI), an equipment identifier, an encryption key, or a mobile subscriber related security value) from a network node to be validated and determining whether the identification information from the network node to be validated matches trusted or verified subscriber related information stored in a validation data store. For example, if subscriber related information from a network node does not match subscriber related information from a validation data store, then the network node may be determined to be invalid or likely to be invalid and if subscriber related information from the network node does match subscriber related information from the validation data store, then the network node may be determined to be valid or likely to be valid.

In some embodiments, NN 108 may be configured to perform one or more actions based on a network node validation analysis or a related determination. For example, in response to determining that a network node is valid, NN 108 may forward a related message to a location register (e.g., HLR(s) 110 or another location register), may send a message to a node (e.g., a network operator management center) indicating that the network node or location information from the network node is valid, and/or may copy or store a portion of the message. In another example, in response to determining that the network node is invalid, NN 108 may screen, filter, or discard a related message, may send a purge MS message to HLR(s) 110, may stop a related message from reaching a location register, may send a message to a node indicating that the network node or location information from the network node is invalid, and/or may copy or store a portion of the message.

VDS 118 may represent any suitable entity for maintaining and/or providing a repository for subscriber related information. In some embodiments, VDS 118 may include an equipment identity register (EIR) functionality or related data. For example, VDS 118 may include a database or other data store containing IMEIs of subscriber devices associated with the home network and other data. In this example, the IMEIs may be indexed by IMSIs or other subscriber identifiers. In some embodiments, VDS 118 may be queried by other nodes in communications environment 100 to determine an IMEI, an IMSI, or other information related to a mobile subscriber.

In some embodiments, VDS 118 may receive subscriber related information from many sources, e.g., MSCs, VLRs, call/setup control functions (CSCFs), NN 108, HLR(s) 110, SGSN 106, GGSN 114, V-GGSN 112, and/or other nodes. In some embodiments, NN 108 and/or other SPs in communications environment 100 may be configured to send subscriber related information to VDS 118 in response to receiving or intercepting messages containing such information, e.g., if such messages are from trusted sources (e.g., home network nodes or previously validated network nodes from other networks).

The visited network may include an access network 104, a VLR and/or MSC (VLR/MSC) 105, SGSN 106, and a visitor GGSN (V-GGSN) 112. Access network 104 may represent a radio access network and may include various nodes for communicating with UE 102 and elements within communications environment 100. Example nodes in access network 104 may include a node B (NB), a radio network controller, a base station, or other transceiver node, which may perform radio access functions. Access network 104, or nodes therein, may be used for communications between UE 102 and nodes in the visited network or communications environment 100. For example, an NB or other node (e.g., a gateway) may communicate UE-related messages (e.g., authentication or mobility related messages) to SGSN 106 or other nodes.

VLR/MSC 105 may represent any suitable entity or entities for performing one or more mobility management functions, such as tracking UE 102. In some embodiments, VLR/MSC 105 may communicate information (e.g., mobility-related information) to other nodes in communications environment 100. For example, VLR/MSC 105 may receive registration requests from a transceiver node in access network 104 and may communicate with HLR(s) 110 for performing authentication and/or for updating the current location of the mobile subscriber. VLR/MSC 105 may also maintain or store location information for roaming subscribers. Additionally, VLR/MSC 105 may communicate with various other nodes and perform various other functions.

SGSN 106 represents a node or gateway for facilitating communications between access network 104 and other nodes (e.g., V-GGSN 112) or networks. In some embodiments, SGSN 106 may communicate user traffic to other nodes in communications environment 100. In some embodiments, SGSN 106 may also perform one or more mobility management functions.

V-GGSN 112 may be any suitable entity for providing access to Internet 116 or other data networks, e.g., an Internet access point. In some embodiments, if SGSN 106 receives a signaling message indicating that a roaming subscriber can receive data services via an ARP, SGSN 106 may route IP traffic and/or related messages destined for Internet 116 via V-GGSN 112 in the visited network. In some embodiments, if SGSN 106 receives a signaling message indicating that a roaming subscriber cannot receive data services via an ARP, SGSN 106 may route IP traffic and/or related messages destined for Internet 116 via GGSN 114 in the home network instead of via V-GGSN 112.

It will be appreciated that FIG. 1 is for illustrative purposes and that various nodes and/or modules, locations, and/or functionality described above in relation to FIG. 1 may be changed, altered, added, or removed.

Figure 2:
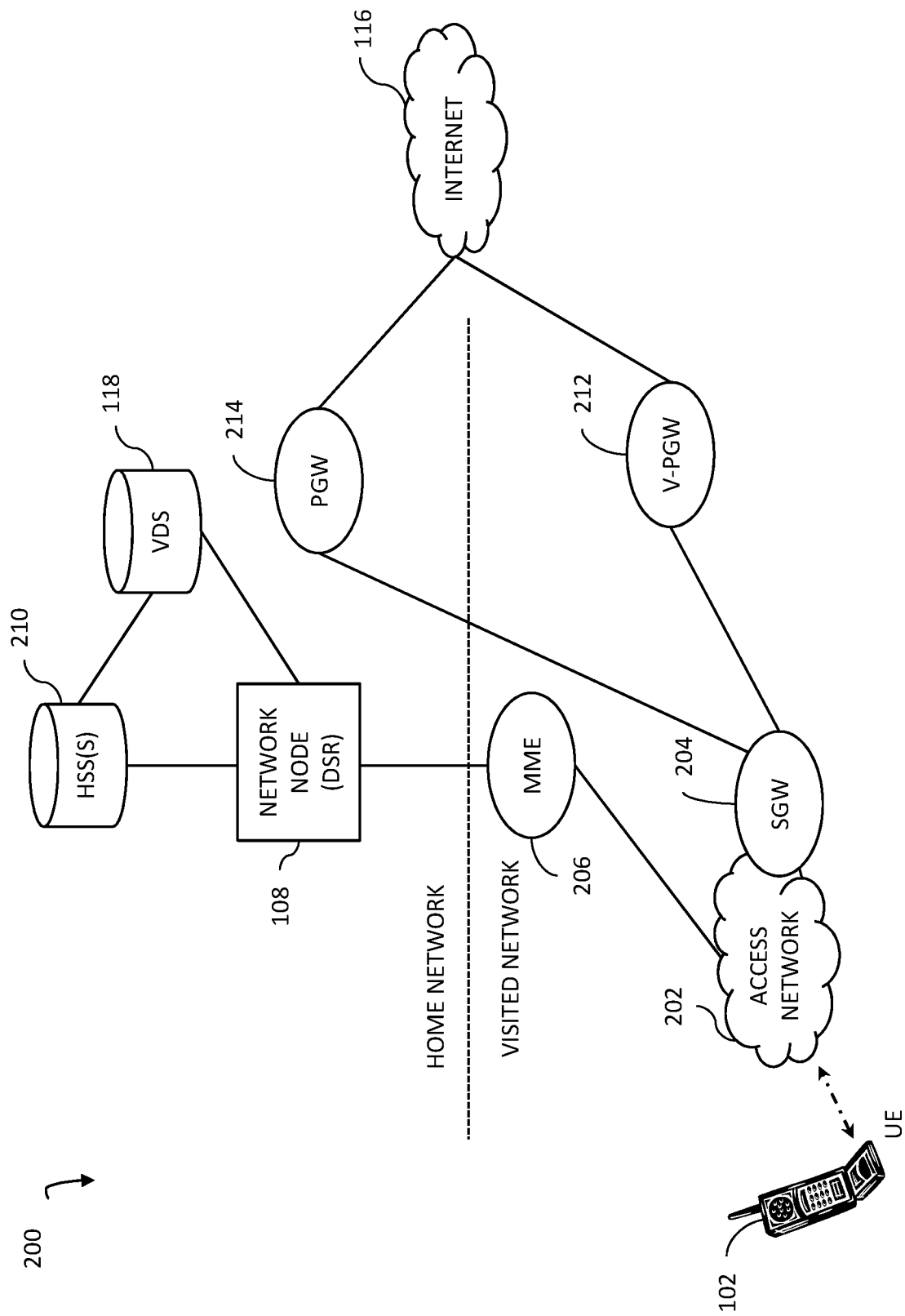
FIG. 2 is a diagram illustrating another example communications environment for network node validation.

FIG. 2 is a diagram illustrating another example communications environment 200 for network node validation. FIG. 2 includes a UE 102 (e.g., a mobile device, a tablet computing platform, or a smartphone) capable of roaming or moving between different portions of a communications environment 200. In some embodiments, communications environment 200 may include one or more nodes associated with a fourth generation (4G) network, a long term evolution (LTE) network, a LTE-advanced network, and/or an evolved packet core (EPC) network.

Communications environment 200 may include a home network (e.g., an HPLMN) and a visited network (e.g., a VPLMN). The home network may be associated with UE 102 and may be the UE's default network, while the visited network may be a network that UE 102 may use or may attempt to use while roaming outside the home network's coverage area. In some embodiments, the home network and the visited network may include nodes for communicating with an external network, such as Internet 116.

The home network may include various nodes, e.g., a packet gateway (PGW) 214, NN 108, one or more home subscriber servers (HSSs) 210, and/or VDS 118. In some embodiments, a home network may be configured as a mobile subscriber's default roaming provider. In some embodiments, a home network may be configured to allow a mobile subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access). For example, an ARP may provide data services at lower rates than a mobile subscriber's home network and may also help in alleviating network load or congestion in the mobile subscriber's home network by handling some subscribers' IP traffic.

PGW 214 may be any suitable entity for providing access to Internet 116 or other data networks, e.g., an Internet access point. For example, a serving gateway (SGW) 204 may communicate with PGW 214 to provide Internet access. In some embodiments, if SGW 204 receives a signaling message indicating that a roaming subscriber cannot receive data services via an ARP, SGW 204 may route IP traffic and/or related messages destined for Internet 116 via PGW 214 in the home network.

HSS(s) 210 may represent any suitable entity or entities for maintaining and/or providing one or more SDM or CRM functions. HSS(s) 210 may maintain subscriber-related information, such as user identification, control information for user authentication and authorization, location information, and user profile data. For example, HSS(s) 210 may include a database containing details about a mobile subscriber identity module (SIM) card associated with UE 102, services available to UE 102, and the current location (e.g., current serving node) of UE 102.

In some embodiments, where HSS(s) 210 involves multiple nodes, each node may maintain information for a portion of subscribers, e.g., hundreds of thousands to millions of subscribers and various nodes in communications environment 100 may be configured to identify and consult the appropriate node for information about a particular subscriber.

In some embodiments, HSS(s) 210 may perform mobility management procedures in response to receiving a Diameter message or other messages. Mobility management messages may be received from mobility management entity (MME) 206 or other nodes in communications environment 200.

NN 108 may be any suitable entity (e.g., one or more computing platforms or devices) for receiving, processing, routing, and/or forwarding messages. In some embodiments, NN 108 in communications environment 200 may include functionality similar to functionality of NN 108 in communications environment 100. In some embodiments, NN 108 may include a Diameter relay agent and/or a Diameter signaling router (DRA/DSR). For example, NN 108 may route and/or forward various Diameter messages between nodes in communications environment 200.

In some embodiments, NN 108 may include functionality for facilitating communications between nodes in the home network and nodes in the visited network. For example, mobility management messages and/or registration related messages may be sent from MME 206 to HSS(s) 210 via NN 108. While only one SP is depicted in communications environment 200, it will be appreciated that multiple SPs may be used to facilitate communication between nodes in communications environment 200.

In some embodiments, NN 108 may include functionality for filtering and/or validating messages. For example, NN 108 may analyze attribute value pair (AVP) information in Diameter signaling messages and may determine how to process or route the signaling messages.

In some embodiments, NN 108 may use filtering for identifying messages that contain subscriber location information, such as mobility management messages from roaming subscribers. For example, NN 108 may be configured to use filters associated with an application identifier (e.g., Application-ID='16777251' may indicate a S6a interface message between HSS(s) 210 and MME 206) and/or command codes (e.g., a Diameter Insert-Subscriber-Data-Request (IDR) message may be associated with a command code of '319' and a Diameter update location request (ULR) message may be associated with a command code of '316'. In this example, NN 108 may be configured to identify relevant messages based on such filters.

In some embodiments, location information may include any information usable for identifying a location of a UE or an associated subscriber. For example, location information may include an MCC, an MNC, a LAC, a network identifier, a CGI, a BSID, an access node identifier, a CI, a SAC, a RAI, a RAC, a TAI, a TAC, an EGCI, location coordinates (e.g., GPS information), and relative location information.

In some embodiments, NN 108 may include functionality for determining a trust level (e.g., a trustworthiness metric) associated with a network node and may perform various actions based on this determination. For example, NN 108 may utilize one or more data structures (e.g., a whitelist and a blacklist) to identify whether a network node is trusted, untrusted, or unknown and may perform other actions based on this trust level determination. In this example, if a network node is unknown, NN 108 may perform network node validation; if a network node is untrusted, all messages from the network node may be blocked or discarded; and if a network node is trusted, subscriber related information may be requested from the network node and may be stored (e.g., in a validation data store or other memory) such that the trusted subscriber related information can be used to validate other network nodes.

In some embodiments, NN 108 may include functionality for performing network node validation. For example, NN 108 may utilize a network node validation algorithm for determining whether a visited or foreign network node, e.g., a node appearing to be an MME, is valid. In some embodiments, a network node validation algorithm may involve obtaining subscriber related information (e.g., an IMEI, an equipment identifier, an encryption key, or a mobile subscriber related security value) from a network node to be validated and determining whether the identification information from the network node to be validated matches trusted or verified subscriber related information stored in a validation data store. For example, if subscriber related information from a network node does not match subscriber related information from a validation data store, then the network node may be determined to be invalid or likely to be invalid and if subscriber related information from the network node does match subscriber related information from the validation data store, then the network node may be determined to be valid or likely to be valid.

In some embodiments, NN 108 may be configured to perform one or more actions based on a network node validation analysis or a related determination. For example, in response to determining that a network node is valid, NN 108 may forward a related message to a location register (e.g., HSS(s) 210 or another location register), may send a message to a node (e.g., a network operator management center) indicating that the network node or location information from the network node is valid, and/or may copy or store a portion of the message. In another example, in response to determining that the network node is invalid, NN 108 may screen, filter, or discard a related message, may send a purge MS message to HSS(s) 210, may stop a related message from reaching a location register, may send a message to a node indicating that the network node or location information from the network node is invalid, and/or may copy or store a portion of the message.

VDS 118 may represent any suitable entity for maintaining and/or providing a repository for subscriber related information. In some embodiments, VDS 118 may include an equipment identity register (EIR) functionality or related data. For example, VDS 118 may include a database or other data store containing IMEIs of subscriber devices associated with the home network and other data. In this example, the IMEIs may be indexed by IMSIs or other subscriber identifiers. In some embodiments, VDS 118 may be queried by other nodes in communications environment 100 to determine an IMEI, an IMSI, or other information related to a mobile subscriber.

In some embodiments, VDS 118 may receive subscriber related information from many sources, e.g., NN 108, HSS(s) 210, SGW 204, PGW 214, V-PGW 212, and/or other nodes. In some embodiments, NN 108 and/or other nodes in communications environment 200 may be configured to send subscriber related information to VDS 118 in response to receiving or intercepting messages containing such information, e.g., if such messages are from trusted sources (e.g., home network nodes or previously validated network nodes from other networks).

The visited network may include an access network 202, MME 206 SGW 204, and a visitor PGW (V-PGW) 212. Access network 202 may represent a radio access network and may include various nodes for communicating with UE 102 and elements within communications environment 200. Example nodes in access network 202 may include an evolved node b (eNB) or other transceiver node, which may perform radio access functions. Access network 202, or nodes therein, may be used for communications between UE 102 and nodes in the visited network or communications environment 200. For example, an eNB or other node (e.g., SGW 204) may communicate UE-related messages (e.g., authentication or mobility related messages) to MME 206 or other nodes.

SGW 204 represents a node or gateway for facilitating communications between access network 202 and other nodes (e.g., V-PGW 212) or networks. In some embodiments, SGW 204 may communicate user traffic to other nodes in communications environment 200.

MME 206 may represent any suitable entity for performing one or more mobility management functions, such as tracking UE 102. In some embodiments, SGW 204 may communicate information (e.g., mobility-related information) to other nodes in communications environment 200. For example, MME 206 may receive registration requests from a transceiver node in access network 202 and may communicate with HSS(s) 210 for performing authentication and/or for updating the current location of the mobile subscriber. Additionally, MME 206 may communicate with various other nodes and perform various other functions.

V-PGW 212 may be any suitable entity for providing access to Internet 116 or other data networks, e.g., an Internet access point. In some embodiments, if SGW 204 receives a signaling message indicating that a roaming subscriber can receive data services via an ARP, SGW 204 may route IP traffic and/or related messages destined for Internet 116 via V-PGW 212 in the visited network. In some embodiments, if SGW 204 receives a signaling message indicating that a roaming subscriber cannot receive data services via an ARP, SGW 204 may route IP traffic and/or related messages destined for Internet 116 via PGW 214 in the home network instead of via V-PGW 212.

It will be appreciated that FIG. 2 is for illustrative purposes and that various nodes and/or modules, locations, and/or functionality described above in relation to FIG. 2 may be changed, altered, added, or removed.

Figure 3:
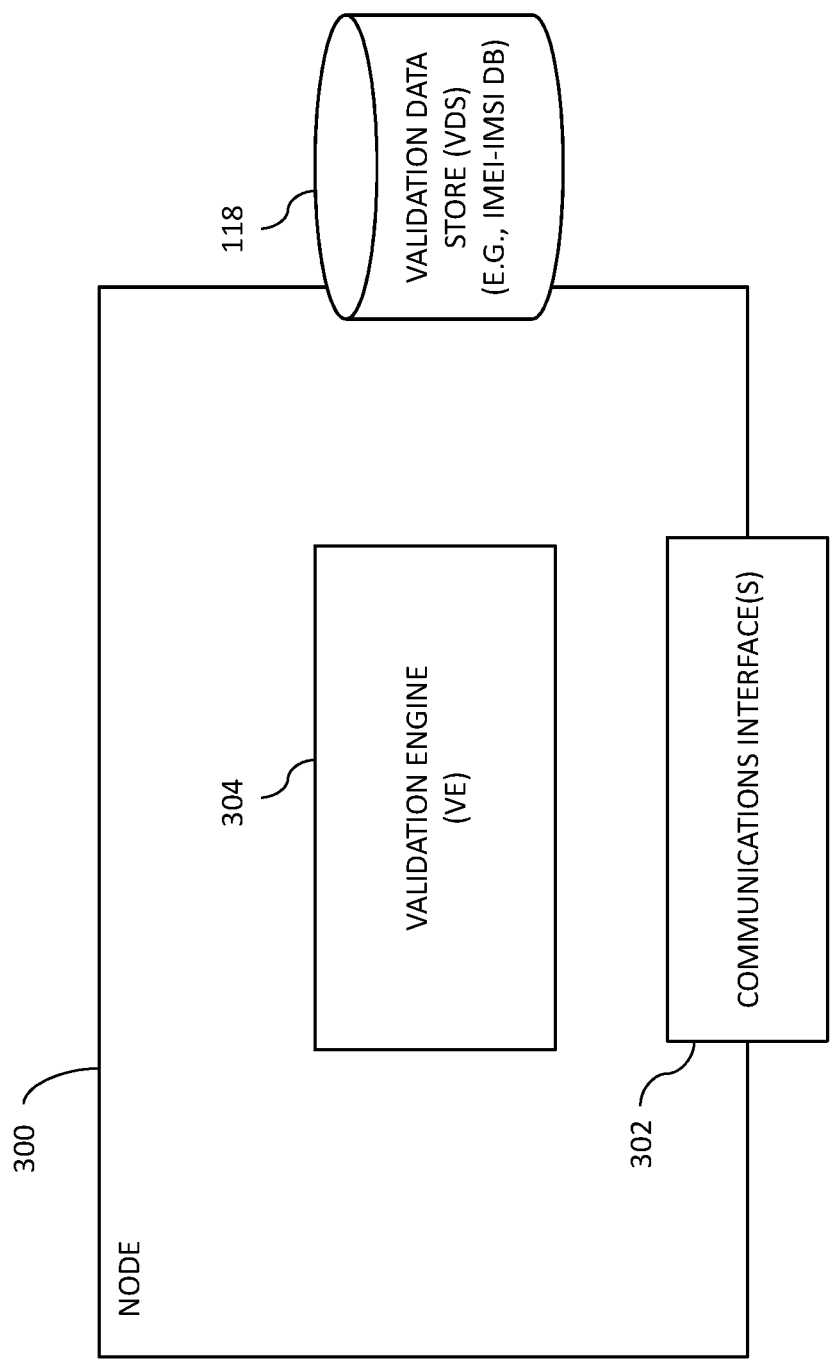
FIG. 3 is a diagram illustrating an example node for network node validation.

FIG. 3 is a diagram illustrating an example node 300 for network node validation. Node 300 may represent any suitable entity or entities for performing aspects of validating subscriber location information. In some embodiments, node 300 may represent NN 108.

Referring to FIG. 3, node 300 may include one or more communications interface(s) 302 for communicating messages (e.g., via an SS7 interface, or a Diameter interface, or other interfaces). In some embodiments, communications interface(s) 302 may include a first communication interface for communicating with HLR(s) 110 and a second communications interface for communicating with HSS(s) 210.

In some embodiments, communications interface(s) 302 may be associated with one or more taps (e.g., computing platforms or devices) for intercepting and/or copying messages in communications environment 100 or communications environment 200.

Node 300 may include a validation engine (VE) 304. VE 304 may be any suitable entity (e.g., software executing on at least one processor) for performing one or more aspects of network node validation or functionality described above with regard to NN 108. In some embodiments, VE 304 may include functionality for identifying messages that contain subscriber location information, such as mobility management messages from roaming subscribers. For example, VE 304 may identify relevant messages by filtering message based on header data and/or payload data.

In some embodiments, VE 304 may include functionality for determining a trust level (e.g., a trustworthiness metric) associated with a network node and may perform various actions based on this determination. For example, VE 304 may utilize one or more data structures (e.g., a whitelist and a blacklist) to identify whether a network node is trusted, untrusted, or unknown and may perform other actions based on this trust level determination. In this example, if a network node is unknown, VE 304 may perform network node validation; if a network node is untrusted, all messages from the network node may be blocked or discarded; and if a network node is trusted, subscriber related information may be requested from the network node and may be stored (e.g., in a validation data store or other memory) such that the trusted subscriber related information can be used to validate other network nodes.

In some embodiments, VE 304 may include functionality for performing network node validation. For example, VE 304 may utilize a network node validation algorithm for determining whether a visited or foreign network node, e.g., a node appearing to be a VLR or MSC, is valid. In some embodiments, a network node validation algorithm may involve obtaining subscriber related information (e.g., an international mobile equipment identity (IMEI), an equipment identifier, an encryption key, or a mobile subscriber related security value) from a network node to be validated and determining whether the identification information from the network node to be validated matches trusted or verified subscriber related information stored in a validation data store. For example, if subscriber related information from a network node does not match subscriber related information from a validation data store, then the network node may be determined to be invalid or likely to be invalid and if subscriber related information from the network node does match subscriber related information from the validation data store, then the network node may be determined to be valid or likely to be valid.

In some embodiments, VE 304 may be configured to perform one or more actions based on a network node validation analysis or a related determination. For example, in response to determining that a network node is valid, VE 304 may forward a related message to a location register (e.g., HLR(s) 110 or another location register), may send a message to a node (e.g., a network operator management center) indicating that the network node or location information from the network node is valid, and/or may copy or store a portion of the message. In another example, in response to determining that the network node is invalid, VE 304 may screen, filter, or discard a related message, may send a purge MS message to HLR(s) 110, may stop a related message from reaching a location register, may send a message to a node indicating that the network node or location information from the network node is invalid, and/or may copy or store a portion of the message.

Node 300 or VE 304 therein may access (e.g., read from and/or write information to) VDS 118 or other data storage. VDS 118 or other data storage may be any suitable entity (e.g., a computer readable medium or memory) for storing subscriber related information and/or other data. In some embodiments, VDS 118 or other data storage may include IMS's, IMEIs, and/or other data associated with one or more subscribers. VDS 118 or other data storage may include information for determining whether subscriber location is valid or invalid.

In some embodiments, VDS 118 or other data storage may include one or more data structures for determining trusted, untrusted, and unknown network nodes. For example, VDS 118 or other data storage may include a whitelist containing URIs or other network node identifiers of trusted or benign network nodes and a blacklist containing URIs or other network node identifiers of untrusted or malicious network nodes. In this example, VE 304 may inspect the whitelist and the blacklist using an identifier associated with a network node and, if not found in either list, VE 304 may treat the network node as an unknown network node that should be validated.

It will be appreciated that FIG. 3 and its related description are for illustrative purposes and that node 300 may include additional and/or different modules, components, or functionality.

Figure 4:
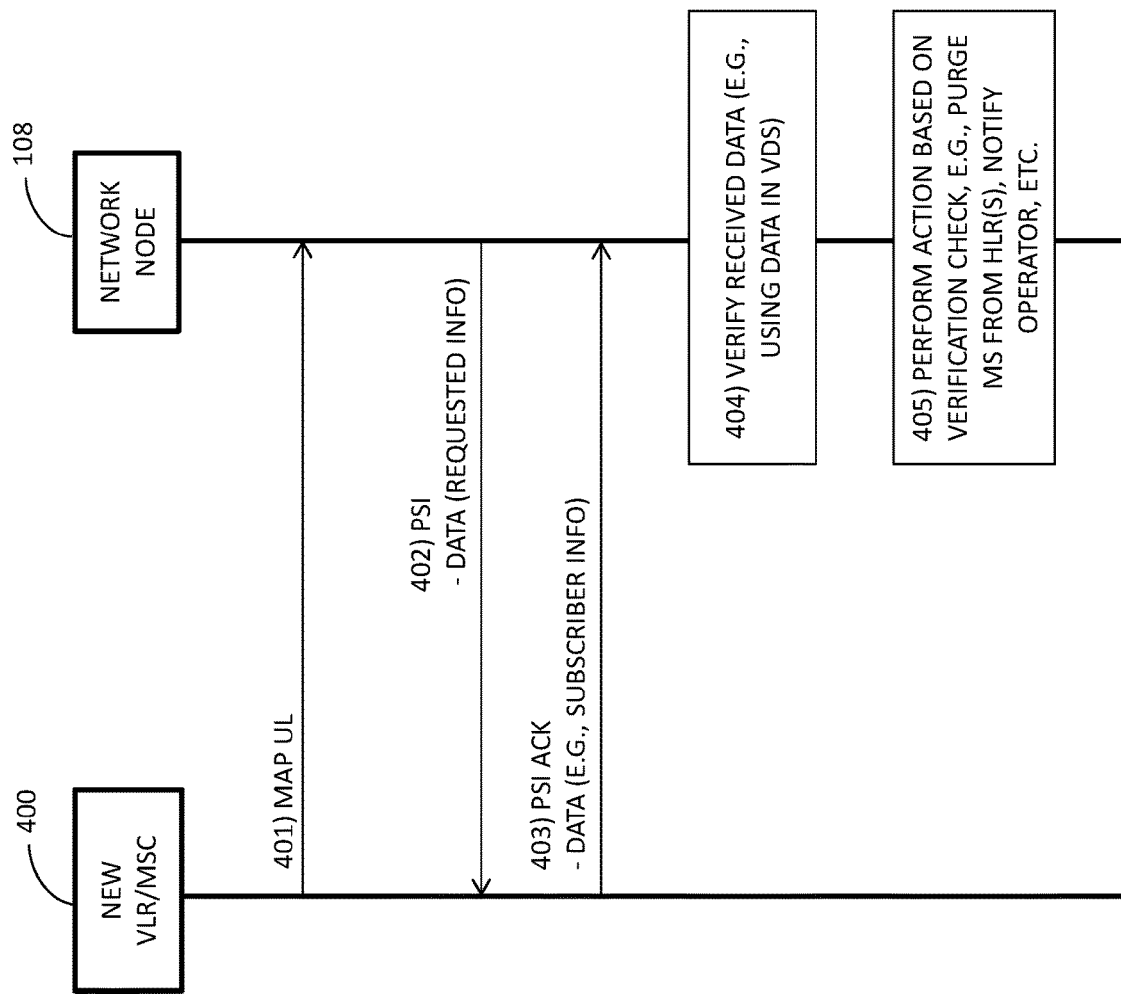
FIG. 4 is a diagram illustrating example mobile application part (MAP) messages associated with network node validation.

FIG. 4 is a diagram illustrating example MAP messages associated with network node validation. In some embodiments, subscriber location information may be provided or set by a VLR/MSC 400, which may or may not be controlled by a malicious actor and/or used for malicious activities (e.g., revenue fraud and/or call interception). In some embodiment, NN 108 may determine whether a network node is valid and may perform various actions based on this determination. In some embodiments, NN 108 may include VE 304 and be configured to request subscriber related information (e.g., IME's) from nodes of a purported visited network (e.g., VLR/MSC 400).

Referring to FIG. 4, in step 401, a MAP UL message may be sent from VLR/MSC 400 to NN 108. The MAP UL message may include information for updating the current location of UE 102 and may be destined to HLR(s) 110.

In some embodiments, NN 108 may determine that VLR/MSC 400 or another network node associated with a received MAP UL message should be validated. For example, after receiving a MAP UL message from VLR/MSC 400, if VLR/MSC 400 is unknown, NN 108 may perform a network node validation, which may include requesting some subscriber related information from VLR/MSC 400 and comparing that with known or verified information from VDS 118 or another trusted source.

In step 402, a MAP provide subscriber information (PSI) or an any time interrogation (ATI) message may be sent from NN 108 to VLR/MSC 400. The MAP PSI or ATI message may indicate what subscriber related information is requested by NN 108, e.g., an IMEI associated with UE 102.

In step 403, a MAP PSI or ATI acknowledgement message may be sent from VLR/MSC 400 to NN 108. The MAP PSI or ATI acknowledgement message may include requested subscriber related information, e.g., an IMEI associated with UE 102.

In step 404, network node validation may be performed by verifying received subscriber related information from VLR/MSC 400 using data in VDS 118. For example, NN 108 may compare a received IMEI associated with a mobile subscriber from VLR/MSC 400 to a verified or known NEI associated with the mobile subscriber stored in VDS 118. In this example, if the received IMEI from VLR/MSC 400 matches the IMEI stored in VDS 118 the network node may be considered valid or validated and if the received IMEI from VLR/MSC 400 does not match the IMEI stored in VDS 118 the network node may be considered invalid or invalidated.

In step 405, at least one action may be performed based on the data verification check (step 404). For example, in response to determining that VLR/MSC 400 is valid, NN 108 may forward a MAP UL message to HLR(s) 110 or another location register, may send a message to a node indicating that VLR/MSC 400 or location information from VLR/MSC 400 is valid (or likely to be valid), or may copy or store a portion of the message. In another example, in response to determining that VLR/MSC 400 is invalid (or likely to be invalid), NN 108 may send a MAP purge MS message to HLR(s) 110 or another location register, discarding a MAP UL message, stopping the MAP UL message from reaching a location register, may send a message to a node indicating that VLR/MSC 400 or location information from VLR/MSC 400 is invalid (e.g., fraudulent), or may copy or store a portion of the message.

In some embodiments, the MAP UL message or a similar MAP UL message may be sent from NN 108 to HLR(s) 110. For example, after determining VLR/MSC 400 is valid (or likely to be valid), NN 108 may send the MAP UL message to HLR(s) 110 or otherwise allow the MAP UL message to continue onwards to HLR(s) 110. In another example, after determining VLR/MSC 400 is invalid (or likely to be invalid), NN 108 may send, to HLR(s) 110, a purge request message for one or more mobile subscribers associated with VLR/MSC 400 such that HLR(s) 110 marks the mobile subscriber as unavailable so as to mitigate potential fraudulent activities.

It will be appreciated that FIG. 4 is for illustrative purposes and that different and/or additional messages and/or actions may be used. It will also be appreciated that various messages and/or actions described herein may occur in a different order or sequence.

Figure 5:
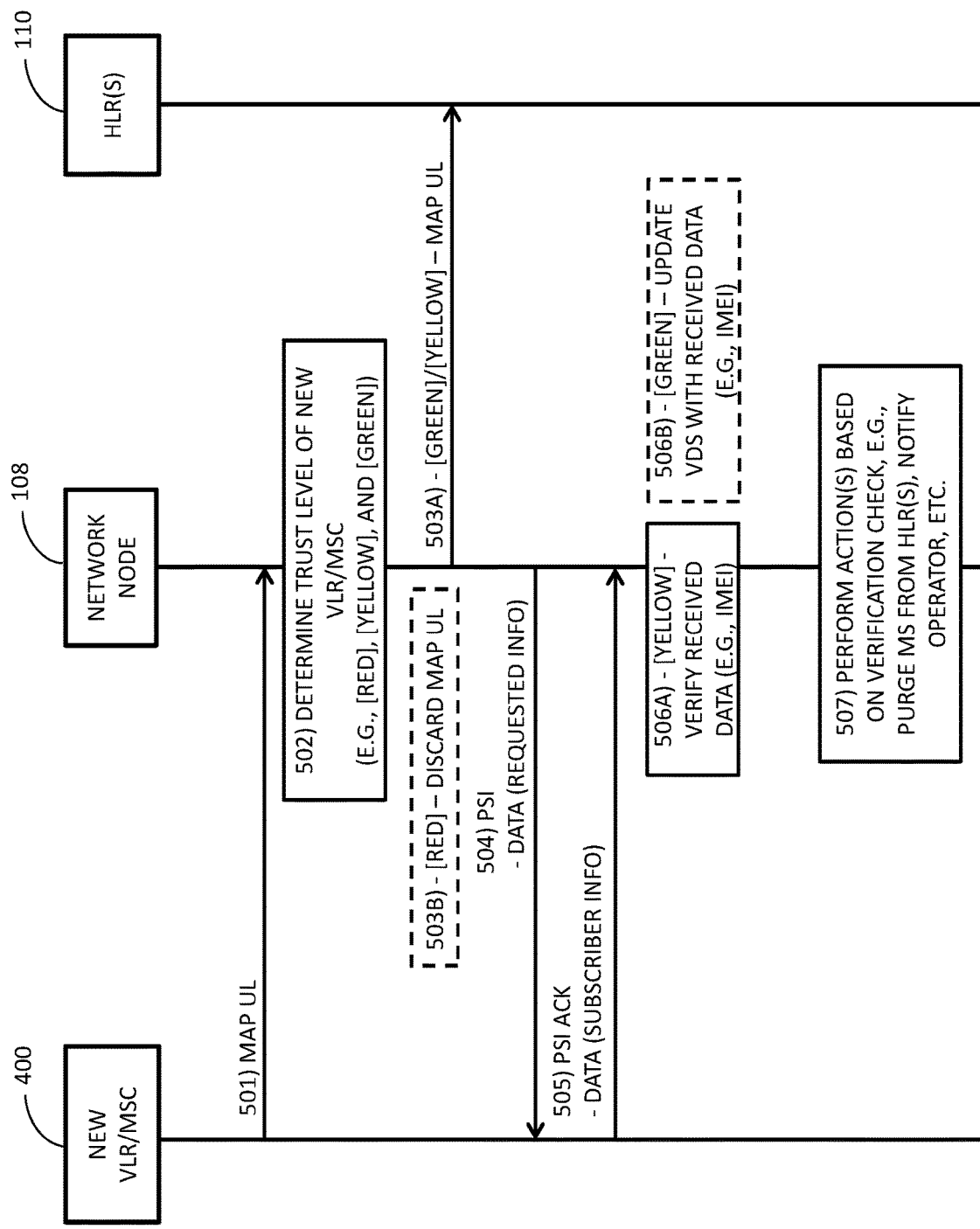
FIG. 5 is a diagram illustrating example MAP messages associated with selective network node validation.

FIG. 5 is a diagram illustrating example MAP messages associated with selective network node validation. In some embodiment, NN 108 may determine a trust level (e.g., a trustworthiness metric) associated with a network node and may perform various actions based on this determination. In some embodiments, NN 108 may utilize one or more data structures (e.g., a whitelist and a blacklist) to identify whether a network node is trusted (e.g., whitelisted or 'Green'), untrusted (e.g., blacklisted or 'RED'), or unknown (e.g., greylisted or 'Yellow') and NN 108 may perform network node validation, store subscriber related information in VDS 118, and/or perform other actions based on this trust level determination.

Referring to FIG. 5, in step 501, a MAP UL message may be sent from VLR/MSC 400 to NN 108. The MAP UL message may include information for updating the current location of UE 102 and may be destined to HLR(s) 110.

In step 502, a trust level of VLR/MSC 400 may be determined. For example, NN 108 and/or VE 304 may query one or more data structures or VDS 118 to determine whether a network node identifier of VLR/MSC 400 is trusted, untrusted, or unknown. In this example, for illustrative purposes, each level may be referred to using a color, e.g., 'Red' represents nodes that are known to be malicious, invalid, or untrusted, 'Green' represents nodes that are known to be benign, valid, or trusted, and 'Yellow' represents nodes that are unknown and should be validated to determine trust level.

In step 503A, if the trust level of VLR/MSC 400 is 'Green' or 'Yellow', the MAP UL message or a similar MAP UL message may be sent from NN 108 to HLR(s) 110. For example, after determining VLR/MSC 400 is not untrusted or blacklisted, NN 108 may send the MAP UL message to HLR(s) 110 or otherwise allow the MAP UL message to continue onwards to HLR(s) 110

In step 503B, if the trust level of VLR/MSC 400 is 'Red', the MAP UL message or a similar MAP UL message may be discarded or otherwise prevented from reaching HLR(s) 110. For example, after determining VLR/MSC 400 is untrusted or blacklisted, NN 108 may discard or block a MAP UL message and/or other messages from VLR/MSC 400 so as to mitigate potential fraudulent activities.

In some embodiments, e.g., if the trust level of VLR/MSC 400 is 'Yellow', NN 108 may determine that VLR/MSC 400 associated with a received MAP UL message should be validated. For example, after receiving a MAP UL message from VLR/MSC 400, if VLR/MSC 400 is unknown, NN 108 may perform a network node validation, which may include requesting some subscriber related information from VLR/

MSC 400 and comparing that with known or verified information from VDS 118 or another trusted source.

In some embodiments, prior to requesting some subscriber related information from VLR/MSC 400, NN 108 may query VDS 118 or related data storage to determine whether verification information already exists for a related subscriber. For example, if the trust level of VLR/MSC 400 is 'Yellow' and if NN 108 and/or VE 304 determines that verification information (e.g., related IMSI and IMEI values) does not exist and/or that network node validation cannot be performed (e.g., because subscriber related information from VLR/MSC 400 cannot be verified), NN 108 and/or VE 304 may forgo requesting subscriber related information. In another example, if the trust level of VLR/MSC 400 is 'Green' and if NN 108 and/or VE 304 determines that verification information (e.g., related IMSI and NEI values) does not exist, NN 108 and/or VE 304 may request subscriber related information from VLR/MSC 400 and may store the identification information from VLR/MSC 400 in VDS 118 for validating other network nodes.

In step 504, a MAP PSI or ATI message may be sent from NN 108 to VLR/MSC 400. The MAP PSI or ATI message may indicate what subscriber related information is requested by NN 108, e.g., an IMEI associated with UE 102.

In step 505, a MAP PSI or ATI acknowledgement message may be sent from VLR/MSC 400 to NN 108. The MAP PSI or ATI acknowledgement message may include requested subscriber related information, e.g., an IMEI associated with UE 102.

In some embodiments, NN 108 and/or VE 304 may be configured to perform network node validation or update VDS 118 depending on the trust level of VLR/MSC 400.

In step 506A, if the trust level of VLR/MSC 400 is 'Yellow', network node validation may be performed by verifying received subscriber related information from VLR/MSC 400 using data in VDS 118. For example, NN 108 may compare a received IMEI associated with a mobile subscriber from VLR/MSC 400 to a verified or known IMEI associated with the mobile subscriber stored in VDS 118. In this example, if the received IMEI from VLR/MSC 400 matches the IMEI stored in VDS 118 the network node may be considered valid or validated and if the received IMEI from VLR/MSC 400 does not match the IMEI stored in VDS 118 the network node may be considered invalid or invalidated.

In step 506B, if the trust level of VLR/MSC 400 is 'Green', received subscriber related information from VLR/MSC 400 may be stored in VDS 118. For example, NN 108 and/or VE 304 may store an IMEI, an IMSI, and/or other subscriber related information from VLR/MSC 400 in VDS 118 for validating other network nodes In step 507, at least one action may be performed based on the data verification check (step 506A). For example, in response to determining that VLR/MSC 400 is valid, NN 108 may forward a MAP UL message to HLR(s) 110 or another location register, may send a message to a node indicating that VLR/MSC 400 or location information from VLR/MSC 400 is valid (or likely to be valid), or may copy or store a portion of the message. In another example, in response to determining that VLR/MSC 400 is invalid (or likely to be invalid), NN 108 may send a MAP purge MS message to HLR(s) 110 or another location register, discarding a MAP UL message, stopping the MAP UL message from reaching a location register, may send a message to a node indicating that VLR/MSC 400 or location information from VLR/MSC 400 is invalid (e.g., fraudulent), or may copy or store a portion of the message.

It will be appreciated that FIG. 5 is for illustrative purposes and that different and/or additional messages and/or actions may be used. It will also be appreciated that various messages and/or actions described herein may occur in a different order or sequence.

Figure 6:
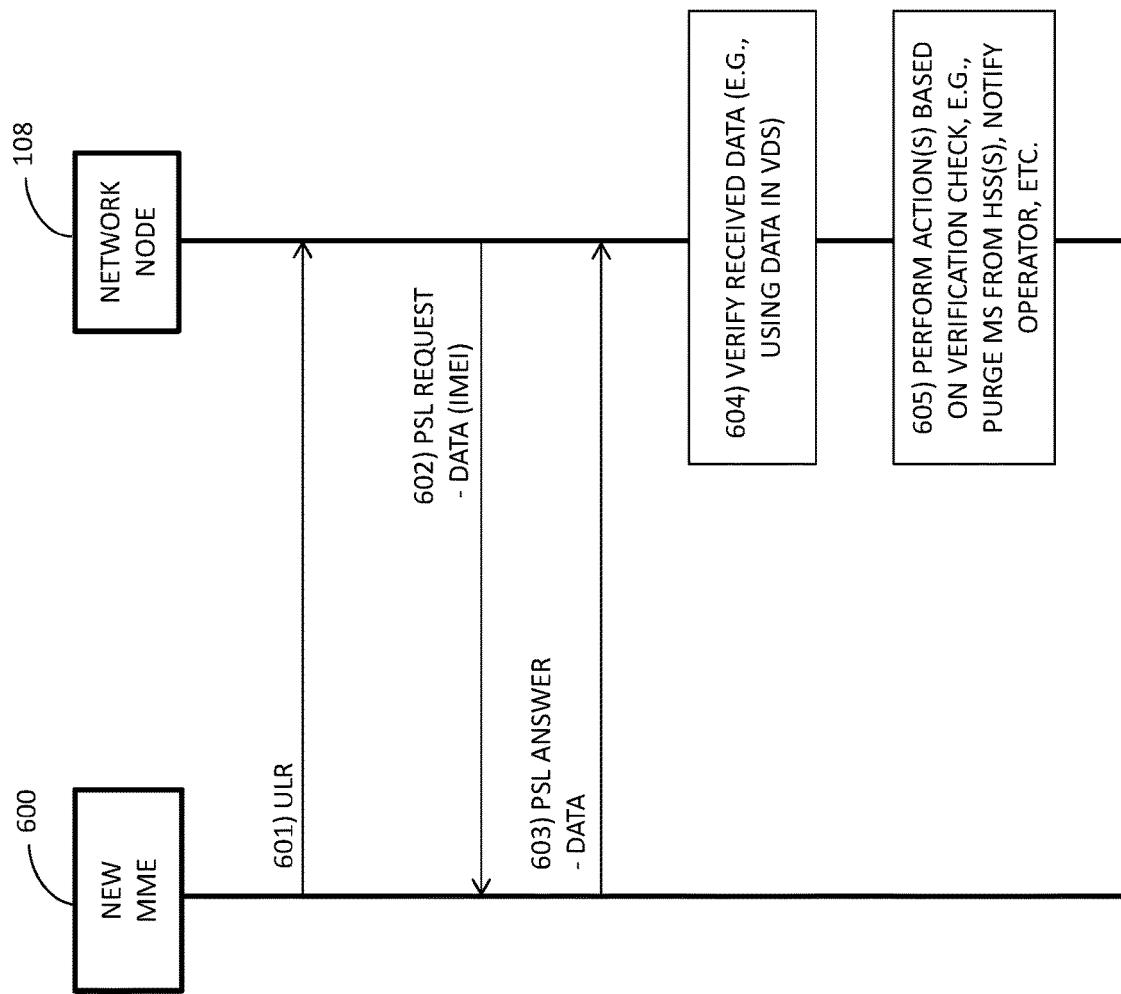
FIG. 6 is a diagram illustrating example Diameter messages associated with network node validation.

FIG. 6 is a diagram illustrating example Diameter messages associated with network node validation. In some embodiments, subscriber location information may be provided or set by a MME 600, which may or may not be controlled by a malicious actor and/or used for malicious activities (e.g., revenue fraud and/or call interception). In some embodiment, NN 108 may determine whether a network node is valid and may perform various actions based on this determination. In some embodiments, NN 108 may include VE 304 and be configured to request subscriber related information (e.g., IME's) from nodes of a purported visited network (e.g., MME 600).

Referring to FIG. 6, in step 601, a Diameter ULR message may be sent from MME 600 to NN 108. The Diameter ULR message may include information for updating the current location of UE 102 and may be destined to HSS(s) 210. In some embodiments, a Diameter ULR message may include an IMSI and/or an IMEI, e.g., stored in a "Terminal Information" AVP other AVP.

In some embodiments, an IMEI may be contained in a Diameter notification request (NOR) message that is sent or forwarded to NN 108. For example, where NN 108 is one of HSS(s) 210, MME 600 may send a NOR message containing an IMEI (e.g., associated with an IMSI in a related Diameter ULR message) via a S6a interface. In this example, the IMEI may be stored in an AVP, e.g., a "Terminal Information" AVP.

In some embodiments, e.g., where a received Diameter ULR message does not contain an IMEI, the IMEI associated with the Diameter ULR message or related IMSI may be received or obtained from VDS 118. For example, after receiving a Diameter ULR message that contains an IMSI or another identifier but not an IMEI, NN 108 may query VDS 118 for a corresponding NEI.

In some embodiments, NN 108 may determine that MME 600 or another network node associated with a received Diameter ULR message should be validated. For example, after receiving a Diameter ULR message from MME 600, if MME 600 is unknown or untrusted, NN 108 may perform a network node validation, which may include requesting some subscriber related information from MME 600 and comparing that with known or verified information from VDS 118 or another trusted source.

In step 602, a Diameter PSL request message may be sent from NN 108 to MME 600. The Diameter PSL request message may request subscriber related information and may include an IMEI for data lookup.

In step 603, a Diameter PSL answer message may be sent from MME 600 to NN 108. For example, if MME 600 can locate a received IMEI (e.g., from a Diameter PSL request message) in its data store, then a Diameter PSL answer message containing valid subscriber related information may be sent to NN 108 indicating that MME 600 is a valid but if MME 600 cannot locate the received IMEI in its data store, then a Diameter PSL answer message indicating an error or containing invalid subscriber related information may be sent to NN 108 indicating that MME 600 is invalid (e.g., fake).

In step 604, network node validation may be performed by verifying received subscriber related information from MME 600 using data in VDS 118. For example, NN 108 may compare a received IMEI associated with a mobile subscriber from MME 600 to a verified or known IMEI associated with the mobile subscriber stored in VDS 118. In this example, if the received IMEI from MME 600 matches the IMEI stored in VDS 118 the network node may be considered valid or validated and if the received IMEI from MME 600 does not match the IMEI stored in VDS 118 the network node may be considered invalid or invalidated.

In step 605, at least one action may be performed based on the data verification check (step 604). For example, in response to determining that MME 600 is valid, NN 108 may forward a Diameter ULR message to HSS(s) 210 or another location register, may send a message to a node indicating that MME 600 or location information from MME 600 is valid (or likely to be valid), or may copy or store a portion of the message. In another example, in response to determining that MME 600 is invalid (or likely to be invalid), NN 108 may send a Diameter purge request message to HSS(s) 210 or another location register, discarding a Diameter ULR message, stopping the Diameter ULR message from reaching a location register, may send a message to a node indicating that MME 600 or location information from MME 600 is invalid (e.g., fraudulent), or may copy or store a portion of the message.

In some embodiments, the Diameter ULR message or a similar Diameter ULR message may be sent from NN 108 to HSS(s) 210. For example, after determining MME 600 is valid (or likely to be valid), NN 108 may send the Diameter ULR message to HSS(s) 210 or otherwise allow the Diameter ULR message to continue onwards to HSS(s) 210. In another example, after determining MME 600 is invalid (or likely to be invalid), NN 108 may send, to HSS(s) 210, a purge request message for one or more mobile subscribers associated with MME 600 such that HSS(s) 210 marks the mobile subscriber as unavailable so as to mitigate potential fraudulent activities.

It will be appreciated that FIG. 6 is for illustrative purposes and that different and/or additional messages and/or actions may be used. It will also be appreciated that various messages and/or actions described herein may occur in a different order or sequence.

Figure 7:
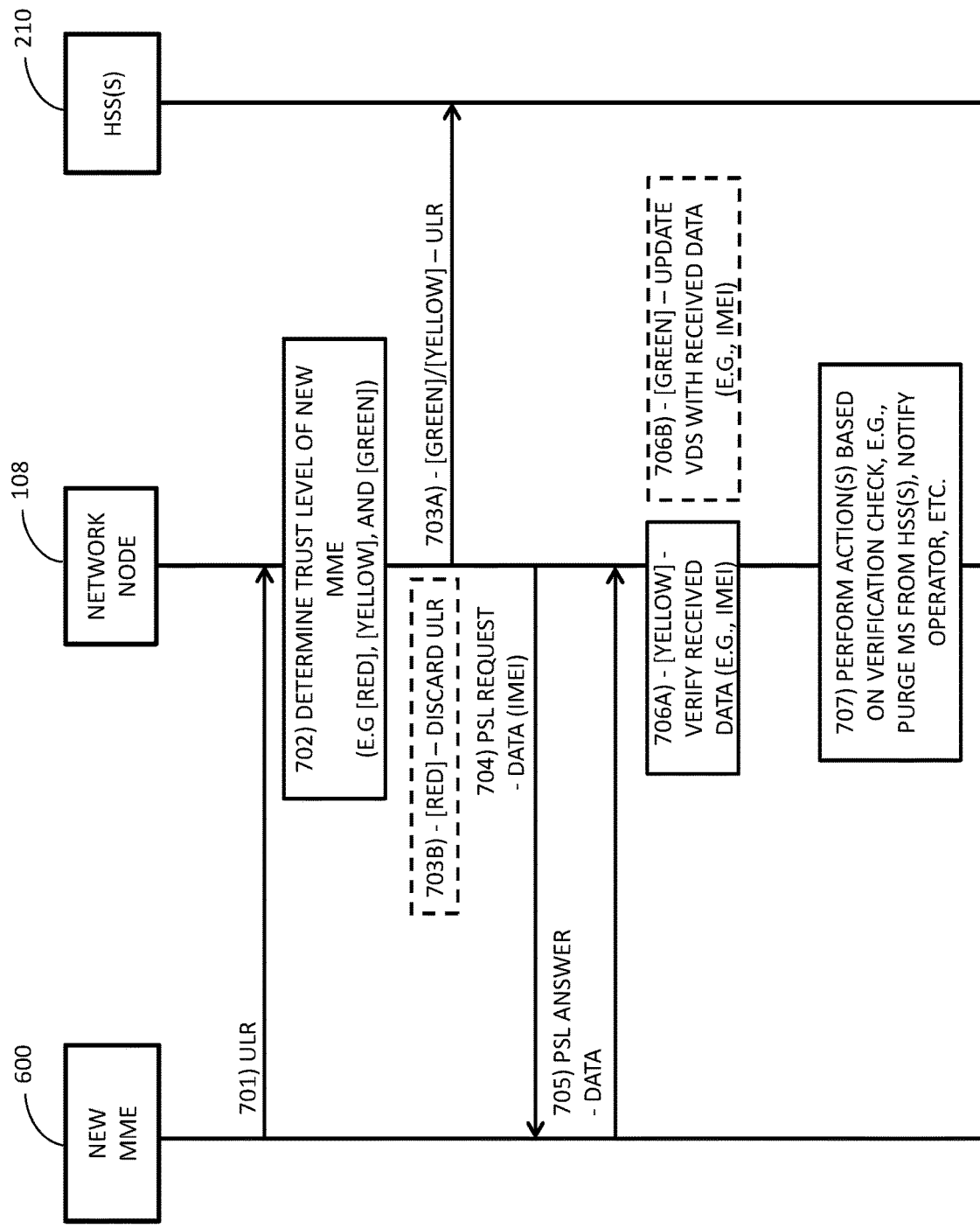
FIG. 7 is a diagram illustrating example Diameter messages associated with selective network node validation.

FIG. 7 is a diagram illustrating example Diameter messages associated with selective network node validation. In some embodiment, NN 108 may determine a trust level (e.g., a trustworthiness metric) associated with a network node and may perform various actions based on this determination. In some embodiments, NN 108 may utilize one or more data structures (e.g., a whitelist and a blacklist) to identify whether a network node is trusted (e.g., whitelisted or 'Green'), untrusted (e.g., blacklisted or 'RED'), or unknown (e.g., greylisted or 'Yellow') and NN 108 may perform network node validation, store subscriber related information in VDS 118, and/or perform other actions based on this trust level determination.

Referring to FIG. 7, in step 701, a Diameter ULR message may be sent from MME 600 to NN 108. The Diameter ULR message may include information for updating the current location of UE 102 and may be destined to HSS(s) 210. In some embodiments, a Diameter ULR message may include an IMSI and/or an IMEI, e.g., stored in a "Terminal Information" AVP other AVP.

In some embodiments, an IMEI may be contained in a Diameter NOR message that is sent or forwarded to NN 108. For example, where NN 108 is one of HSS(s) 210, MME 600 may send a NOR message containing an IMEI (e.g., associated with an IMSI in a related Diameter ULR message) via a S6a interface. In this example, the IMEI may be stored in an AVP, e.g., a "Terminal Information" AVP.

In some embodiments, e.g., where a received Diameter ULR message does not contain an IMEI, the IMEI associated with the Diameter ULR message or related IMSI may be received or obtained from VDS 118. For example, after receiving a Diameter ULR message that contains an IMSI or another identifier but not an IMEI, NN 108 may query VDS 118 for a corresponding NEI.

In step 702, a trust level of MME 600 may be determined. For example, NN 108 and/or VE 304 may query one or more data structures or VDS 118 to determine whether a network node identifier of MME 600 is trusted, untrusted, or unknown. In this example, for illustrative purposes, each level may be referred to using a color, e.g., 'Red' represents nodes that are known to be malicious, invalid, or untrusted, 'Green' represents nodes that are known to be benign, valid, or trusted, and 'Yellow' represents nodes that are unknown and should be validated to determine trust level.

In step 703A, if the trust level of MME 600 is 'Green' or 'Yellow', the Diameter ULR message or a similar Diameter ULR message may be sent from NN 108 to HSS(s) 210. For example, after determining MME 600 is not untrusted or blacklisted, NN 108 may send the Diameter ULR message to HSS(s) 210 or otherwise allow the Diameter ULR message to continue onwards to HSS(s) 210

In step 703B, if the trust level of MME 600 is 'Red', the Diameter ULR message or a similar Diameter ULR message may be discarded or otherwise prevented from reaching HSS(s) 210. For example, after determining MME 600 is untrusted or blacklisted, NN 108 may discard or block a Diameter ULR message and/or other messages from MME 600 so as to mitigate potential fraudulent activities.

In some embodiments, e.g., if the trust level of MME 600 is 'Yellow', NN 108 may determine that MME 600 associated with a received Diameter ULR message should be validated. For example, after receiving a Diameter ULR message from MME 600, if MME 600 is unknown or untrusted, NN 108 may perform a network node validation, which may include requesting some subscriber related information from MME 600 and comparing that with known or verified information from VDS 118 or another trusted source.

In some embodiments, prior to requesting some subscriber related information from MME 600, NN 108 may query VDS 118 or related data storage to determine whether verification information already exists for a related subscriber. For example, if the trust level of MME 600 is 'Yellow' and if NN 108 and/or VE 304 determines that verification information (e.g., related IMSI and IMEI values) does not exist and/or that network node validation cannot be performed (e.g., because subscriber related information from MME 600 cannot be verified), NN 108 and/or VE 304 may forgo requesting subscriber related information. In another example, if the trust level of MME 600 is 'Green' and if NN 108 and/or VE 304 determines that verification information (e.g., related IMSI and IMEI values) does not exist, NN 108 and/or VE 304 may request subscriber related information from MME 600 and may store the identification information from MME 600 in VDS 118 for validating other network nodes.

In step 704, a Diameter PSL request message may be sent from NN 108 to MME 600. The Diameter PSL request message may request subscriber related information and may include an IMEI for data lookup.

In step 705, a Diameter PSL answer message may be sent from MME 600 to NN 108. The PSL answer message may include requested subscriber related information, e.g., an IMEI associated with UE 102. For example, if MME 600 can locate a received IMEI (e.g., from a Diameter PSL request message) in its data store, then a Diameter PSL answer message containing valid subscriber related information may be sent to NN 108 indicating that MME 600 is a valid but if MME 600 cannot locate the received IMEI in its data store, then a Diameter PSL answer message indicating an error or containing invalid subscriber related information may be sent to NN 108 indicating that MME 600 is invalid (e.g., fake).

In some embodiments, NN 108 and/or VE 304 may be configured to perform network node validation or update VDS 118 depending on the trust level of MME 600.

In step 706A, if the trust level of MME 600 is 'Yellow', network node validation may be performed by verifying received subscriber related information from MME 600 using data in VDS 118. For example, NN 108 may compare a received IMEI associated with a mobile subscriber from MME 600 to a verified or known IMEI associated with the mobile subscriber stored in VDS 118. In this example, if the received IMEI from MME 600 matches the IMEI stored in VDS 118 the network node may be considered valid or validated and if the received IMEI from MME 600 does not match the IMEI stored in VDS 118 the network node may be considered invalid or invalidated.

In step 706B, if the trust level of MME 600 is 'Green', received subscriber related information from MME 600 may be stored in VDS 118. For example, NN 108 and/or VE 304 may store an IMEI, an IMSI, and/or other subscriber related information from MME 600 in VDS 118 for validating other network nodes In step 707, at least one action may be performed based on the data verification check (step 706A). For example, in response to determining that MME 600 is valid, NN 108 may forward a Diameter ULR message to HSS(s) 210 or another location register, may send a message to a node indicating that MME 600 or location information from MME 600 is valid (or likely to be valid), or may copy or store a portion of the message. In another example, in response to determining that MME 600 is invalid (or likely to be invalid), NN 108 may send a Diameter purge request message to HSS(s) 210 or another location register, discarding a Diameter ULR message, stopping the Diameter ULR message from reaching a location register, may send a message to a node indicating that MME 600 or location information from MME 600 is invalid (e.g., fraudulent), or may copy or store a portion of the message.

It will be appreciated that FIG. 7 is for illustrative purposes and that different and/or additional messages and/or actions may be used. It will also be appreciated that various messages and/or actions described herein may occur in a different order or sequence.

Figure 8:
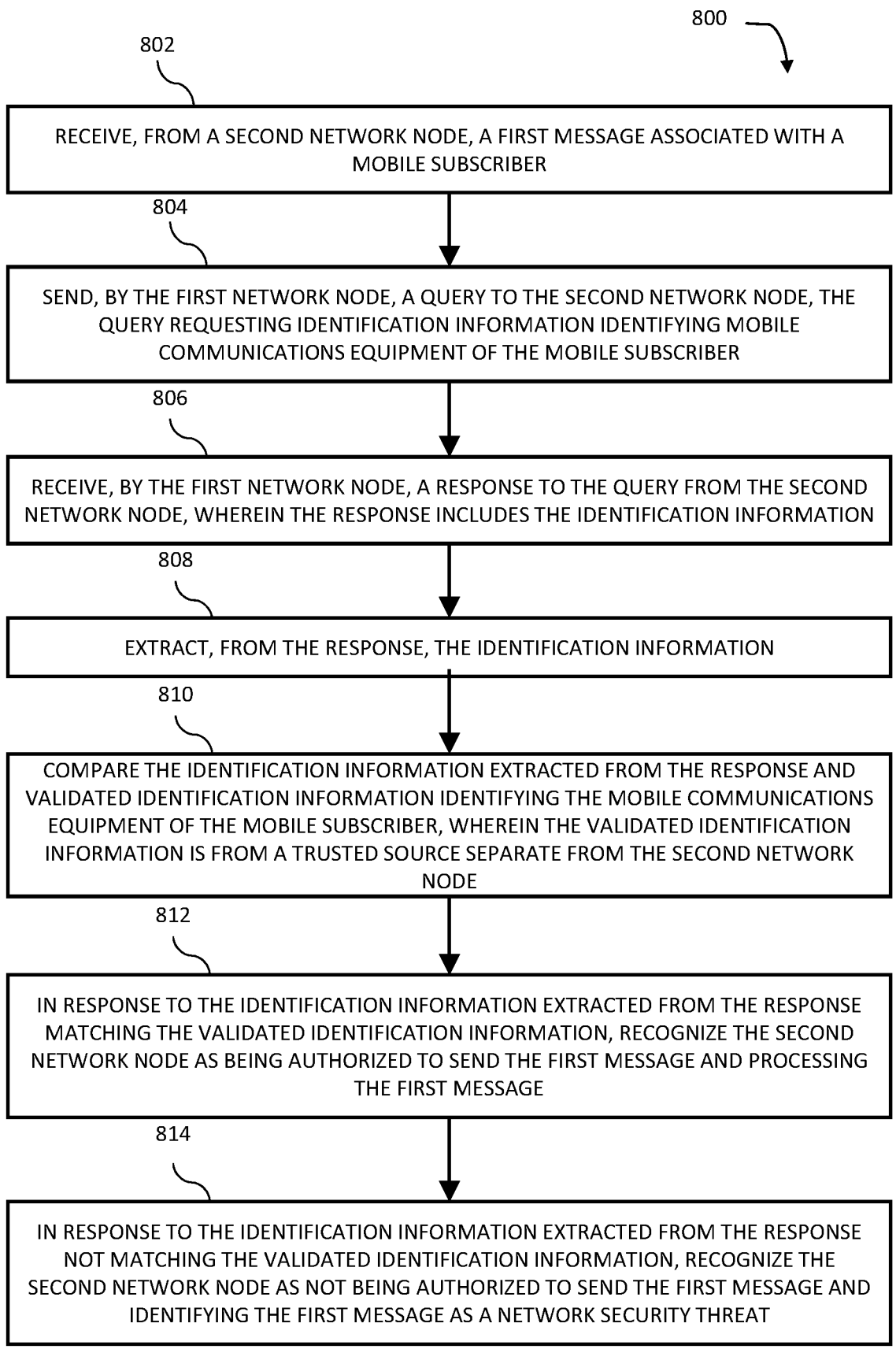
FIG. 8 is a diagram illustrating an example process for network node validation.

FIG. 8 is a diagram illustrating an example process 800 for network node validation. In some embodiments, example process 800 described herein, or portions thereof, may be performed at or performed by NN 108, node 300, VE 304, and/or another module or node.

Referring to example process 800, in step 802, a first message associated with a mobile subscriber may be received from a network node. For example, NN 108 may receive a MAP UL message appearing to be from VLR/MSC 400.

In some embodiments, a first message associated with a mobile subscriber may include a Diameter message, a Diameter ULR message, a Diameter NOR message, a MAP message, a MAP update location message, or a location validation request message.

In step 804, a query may be sent by a first network node to the second network node, the query requesting identification information identifying mobile communications equipment of the mobile subscriber.

In some embodiments, a query may include a MAP PSI request message, a MAP ATI request message, or a Diameter PSL request message and a response to the query may include a MAP PSI response message, a MAP ATI response message, or a Diameter ULR message.

In step 806, a response to the query may be received by the first network node from the second network node, wherein the response includes the identification information. For example, after NN 108 receives a MAP UL message associated with a mobile subscriber from VLR/MSC 400, NN 108 may request an IMEI associated with the mobile subscriber so as to validate VLR/MSC 400 and/or its relationship with the mobile subscriber (and related mobile equipment). In this example, after receiving a MAP PSI message requesting an IMEI associated with a mobile subscriber, VLR/MSC 400 may provide an IMEI associated with the mobile subscriber. In another example, after receiving a MAP PSI message requesting an IMEI, VLR/MSC 400 may not respond or may provide an IMEI that is not associated with the mobile subscriber.

In step 808, the identification information may be extracted from the response.

In step 810, the identification information extracted from the response and validated identification information identifying the mobile communications equipment of the mobile subscriber may be compared. In some embodiments, the validated identification information is from a trusted source separate from the second network node. For example, NN 108 may compare a received IMEI associated with a mobile subscriber from VLR/MSC 400 to a verified or known IMEI associated with the mobile subscriber stored in VDS 118. In this example, if the received IMEI from VLR/MSC 400 matches the IMEI stored in VDS 118 the network node may be considered valid or validated and if the received IMEI from VLR/MSC 400 does not match the IMEI stored in VDS 118 the network node may be considered invalid or invalidated.

In some embodiments, validated identification information may be obtained by querying, using a mobile subscriber identifier associated with the mobile subscriber, a validation data store to obtain a IMEI associated with the mobile subscriber, wherein the validation data store (e.g., VDS 118) contains IMEIs indexed by mobile subscriber identifiers.

In some embodiments, a trusted source for providing validated identification information includes a home network node, a data store, or a previously validated network node. For example, when a Diameter ULR message is received from MME 600, NN 108 may use a network node identifier (e.g., an originating URI) and a whitelist for determining whether the network node is trusted. In this example, if MME 600 is trusted, NN 108 may request an IMEI and/or other subscriber related information associated with a particular subscriber and may store the information in VDS 118 once the information is received from MME 600.

In step 812, in response to the identification information extracted from the response matching the validated identification information, the second network node may be recognized as being authorized to send the first message and the first message may be processed.

In some embodiments, processing a first message may include forwarding the first message to a location register, sending a message to a node indicating that the network node or location information from the network node is valid, or copying or storing a portion of the first message.

In step 814, in response to the identification information extracted from the response not matching the validated identification information, the second network node may be recognized as not being authorized to send the first message and may identify the first message as a network security threat.

In some embodiments, in response to identifying a first message as a network security threat, a first network node may send a MAP purge MS message, send a Diameter purge request message, discard the first message, stop the first message from reaching a location register, sending a message to a node indicating that the network node or location information from the network node is invalid, or copying or storing a portion of the first message.

In some embodiments, a location register may include a HLR or a HSS.

In some embodiments, a first network node (e.g., NN 108, node 300, or a network node that includes VE 304) may include a Diameter node, a Diameter routing agent, a Diameter signaling router, a gateway, a signaling router, an STP, a signaling gateway (SG), a signaling system number 7 (SS7) node, or a signaling node.

In some embodiments, a second network node (e.g., a network node that sends a MAP UL message or a Diameter ULR message) may include an MME, a VLR, an MSC, a node in a visited network, a foreign network node, a SGSN, or a gateway.

It will be appreciated that while some aspects of the subject matter described herein has been discussed with reference to SS7 and Diameter based mobile networks (e.g., 2G, 3G, 4G, LTE, EPC/EPS), various other networks may utilize some aspects of the subject matter described herein. For example, any network that utilize messages and/or includes a message routing node may use features, mechanisms and techniques described herein to validate a network node or mitigate (e.g., screen or filter) messages therefrom.

It should be noted that NN 108, node 300, and/or functionality described herein may constitute a special purpose computing device. Further, NN 108, node 300, and/or functionality described herein can improve the technological field of network security and/or fraud prevention. For example, by validating network nodes (e.g., nodes that appear to be VLR/MSC or MMEs) and performing one or more mitigating actions when such network nodes appear to be invalid (e.g., fraudulent), malicious activities and their negative consequences (e.g., revenue fraud) can be avoided and/or prevented.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for validating a network node, the method comprising:
    at a first network node:
        receiving, from a second network node, a first message associated with a mobile subscriber;
        sending, by the first network node, a query to the second network node, the query requesting identification information identifying mobile communications equipment of the mobile subscriber, wherein the second network node is separate from the mobile communications equipment of the mobile subscriber;
        receiving, by the first network node, a response to the query from the second network node, wherein the response includes the identification information, wherein the identification information includes a first international mobile equipment identity (IMEI);
        extracting, from the response, the identification information;
        comparing the identification information extracted from the response and validated identification information identifying the mobile communications equipment of the mobile subscriber, wherein the validated identification information includes a second IMEI and is from a trusted source separate from the second network node;
        in response to the identification information extracted from the response matching the validated identification information, recognizing the second network node as being authorized to send the first message and processing the first message;
        in response to the identification information extracted from the response not matching the validated identification information, recognizing the second network node as not being authorized to send the first message and identifying the first message as a network security threat; and
        in response to identifying the first message as a network security threat, sending a mobile application part (MAP) purge MS message, sending a Diameter purge request message, discarding the first message, stopping the first message from reaching a location register, sending a message to a node indicating that the second network node is invalid, or copying or storing a portion of the first message.

2. The method of claim 1 wherein the first message includes a Diameter message, a Diameter update location request (ULR) message, a Diameter notification request (NOR) message, a mobile application part (MAP) message, a MAP update location message, or a location validation request message.

3. The method of claim 1 wherein the identification information further includes an equipment identifier, an encryption key, or a mobile subscriber related security value.

4. The method of claim 1 wherein the query includes a mobile application part (MAP) provide subscriber information (PSI) request message, a MAP any time interrogation (ATI) request message, or a Diameter provide subscriber location (PSL) request message and wherein the response includes a MAP PSI response message, a MAP ATI response message, or a Diameter update location request (ULR) message.

5. The method of claim 1 wherein the validated identification information is obtained by querying, using a mobile subscriber identifier associated with the mobile subscriber, a validation data store to obtain the second IMEI associated with the mobile subscriber, wherein the validation data store contains IMEIs indexed by mobile subscriber identifiers.

6. The method of claim 1 wherein the trusted source includes a home network node, a data store, or a previously validated network node.

7. The method of claim 1 wherein processing the first message includes forwarding the first message to a location register, sending a message to a node indicating that the second network node is valid, or copying or storing a portion of the first message.

8. The method of claim 1 wherein the first network node includes a Diameter node, a Diameter routing agent, a Diameter signaling router, a gateway, a signaling router, a signal transfer point (STP), a signaling gateway (SG), a signaling system number 7 (SS7) node, or a signaling node and wherein the second network node includes a mobility management element (MME), a visitor location register (VLR), a mobile switching center (MSC), a node in a visited network, a foreign network node, a serving general packet radio service (GPRS) support node (SGSN), or a gateway.

9. A system for validating a network node, the system comprising:
a first network node comprising:
at least one processor; and
a memory,
wherein the first network node is configured for:
receiving, from a second network node, a first message associated with a mobile subscriber;
sending, by the first network node, a query to the second network node, the query requesting identification information identifying mobile communications equipment of the mobile subscriber, wherein the second network node is separate from the mobile communications equipment of the mobile subscriber;
receiving, by the first network node, a response to the query from the second network node, wherein the response includes the identification information, wherein the identification information includes a first international mobile equipment identity (IMEI);
extracting, from the response, the identification information;
comparing the identification information extracted from the response and validated identification information identifying the mobile communications equipment of the mobile subscriber, wherein the validated identification information includes a second IMEI and is from a trusted source separate from the second network node;
in response to the identification information extracted from the response matching the validated identification information, recognizing the second network node as being authorized to send the first message and processing the first message;
in response to the identification information extracted from the response not matching the validated identification information, recognizing the second network node as not being authorized to send the first message and identifying the first message as a network security threat; and
in response to identifying the first message as a network security threat, sending a mobile application part (MAP) purge MS message, sending a Diameter purge request message, discarding the first message, stopping the first message from reaching a location register, sending a message to a node indicating that the second network node is invalid, or copying or storing a portion of the first message.

10. The system of claim 9 wherein the first message includes a Diameter message, a Diameter update location request (ULR) message, a Diameter notification request (NOR) message, a mobile application part (MAP) message, a MAP update location message, or a location validation request message.

11. The system of claim 9 wherein the identification information further includes an equipment identifier, an encryption key, or a mobile subscriber related security value.

12. The system of claim 9 wherein the query includes a mobile application part (MAP) provide subscriber information (PSI) request message, a MAP any time interrogation (ATI) request message, or a Diameter provide subscriber location (PSL) request message and wherein the response includes a MAP PSI response message, a MAP ATI response message, or a Diameter update location request (ULR) message.

13. The system of claim 9 wherein the validated identification information is obtained by querying, using a mobile subscriber identifier associated with the mobile subscriber, a validation data store to obtain the second NEI associated with the mobile subscriber, wherein the validation data store contains IMEIs indexed by mobile subscriber identifiers.

14. The system of claim 9 wherein the trusted source includes a home network node, a data store, or a previously validated network node.

15. The system of claim 9 wherein processing the first message includes forwarding the first message to a location register, sending a message to a node indicating that the second network node is valid, or copying or storing a portion of the first message.

16. The system of claim 9 wherein the first network node includes a Diameter node, a Diameter routing agent, a Diameter signaling router, a gateway, a signaling router, a signal transfer point (STP), a signaling gateway (SG), a signaling system number 7 (SS7) node, or a signaling node and wherein the second network node includes a mobility management element (MME), a visitor location register (VLR), a mobile switching center (MSC), a node in a visited network, a foreign network node, a serving general packet radio service (GPRS) support node (SGSN), or a gateway.

17. A non-transitory computer readable medium comprising computer executable instructions embodied in the non-transitory computer readable medium that when executed by at least one processor of at least one computer cause the at least one computer to perform steps comprising:
at a first network node:
receiving, from a second network node, a first message associated with a mobile subscriber;
sending, by the first network node, a query to the second network node, the query requesting identification information identifying mobile communications equipment of the mobile subscriber, wherein the second network node is separate from the mobile communications equipment of the mobile subscriber;
receiving, by the first network node, a response to the query from the second network node, wherein the response includes the identification information, wherein the identification information includes a first international mobile equipment identity (IMEI);
extracting, from the response, the identification information;
comparing the identification information extracted from the response and validated identification information identifying the mobile communications equipment of the mobile subscriber, wherein the validated identification information includes a second IMEI and is from a trusted source separate from the second network node;
in response to the identification information extracted from the response matching the validated identification information, recognizing the second network node as being authorized to send the first message and processing the first message;
in response to the identification information extracted from the response not matching the validated identification information, recognizing the second network node as not being authorized to send the first message and identifying the first message as a network security threat; and in response to identifying the first message as a network security threat, sending a mobile application part (MAP) purge MS message, sending a Diameter purge request message, discarding the first message, stopping the first message from reaching a location register, sending a message to a node indicating that the second network node is invalid, or copying or storing a portion of the first message.

18. The non-transitory computer readable medium of claim 17 wherein the first message includes a Diameter message, a Diameter update location request (ULR) message, a mobile application part (MAP) message, a MAP update location message, or a location validation request message.

* * * * *

UNITED STATES PATENT AND TRADEMARK OFFICE
CERTIFICATE OF CORRECTION

PATENT NO. : 10,931,668 B2
APPLICATION NO. : 16/024422
DATED : February 23, 2021
INVENTOR(S) : Mehta Page 1 of 2

It is certified that error appears in the above-identified patent and that said Letters Patent is hereby corrected as shown below:

On the Title Page

On page 2, Column 2, Item (56) under Other Publications, Line 21, delete "(Unpubllshed," and insert -- (Unpublished, --, therefor.

On page 3, Column 1, Item (56) under Other Publications, Line 8, delete "15/676,631" and insert -- 15/376,631 --, therefor.

On page 3, Column 2, Item (56) under Other Publications, Line 3, delete ""Digitial" and insert -- "Digital --, therefor.

On page 3, Column 2, Item (56) under Other Publications, Line 24, delete "Monile" and insert -- Mobile --, therefor.

On page 4, Column 1, Item (56) under Other Publications, Line 27, after "2019)" insert -- . --.

On page 4, Column 1, Item (56) under Other Publications, Line 32, delete "lndirect" and insert -- Indirect --, therefor.

On page 4, Column 2, Item (56) under Other Publications, Line 16, delete "Internatioanl" and insert -- International --, therefor.

In the Specification

In Column 12, Line 52, delete "IMS's," and insert -- IMSIs, --, therefor.

In Column 13, Line 15, delete "IME's)" and insert -- IMEIs) --, therefor.

In Column 13, Line 44, delete "NEI" and insert -- IMEI --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,931,668 B2

In Column 14, Line 53, after "110" insert -- . --.

In Column 15, Line 17, delete "NEI" and insert -- IMEI --, therefor.

In Column 15, Line 51, after "nodes" insert -- . --.

In Column 16, Line 16, delete "IME's)" and insert -- IMEIs) --, therefor.

In Column 16, Line 39, delete "NEI." and insert -- IMEI. --, therefor.

In Column 18, Line 7, delete "NEI." and insert -- IMEI. --, therefor.

In Column 18, Line 24, after "210" insert -- . --.

In the Claims

In Column 24, Line 9, in Claim 13, delete "NEI" and insert -- IMEI --, therefor.